United States Patent
DeFelice et al.

(10) Patent No.: US 12,543,666 B2
(45) Date of Patent: *Feb. 10, 2026

(54) INTELLIGENT SYSTEMS FOR WEATHER MODIFICATION PROGRAMS

(71) Applicants: Thomas Peter DeFelice, Sheboygan, WI (US); Duncan Axisa, Boulder, CO (US)

(72) Inventors: Thomas Peter DeFelice, Sheboygan, WI (US); Duncan Axisa, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/390,526

(22) Filed: Dec. 20, 2023

(65) Prior Publication Data
US 2024/0276927 A1 Aug. 22, 2024

Related U.S. Application Data

(63) Continuation of application No. 17/106,159, filed on Nov. 29, 2020, now Pat. No. 11,882,798, which is a
(Continued)

(51) Int. Cl.
*A01G 15/00* (2006.01)
*G05D 1/228* (2024.01)
(Continued)

(52) U.S. Cl.
CPC ............. *A01G 15/00* (2013.01); *G05D 1/228* (2024.01); *G05D 1/689* (2024.01); *G08G 5/76* (2025.01)

(58) Field of Classification Search
CPC .... A01G 15/00; G05D 1/0088; G05D 1/0094; G08G 5/0091
See application file for complete search history.

(56) References Cited

U.S. PATENT DOCUMENTS 3,899,129 A * 8/1975 Fukuta .................. A01G 15/00
239/14.1
RE29,142 E * 2/1977 Papee .................... A01G 15/00
149/117
(Continued)

FOREIGN PATENT DOCUMENTS

CA 2962076 A1 3/2016
DE 2137815 A1 2/1973
(Continued)

OTHER PUBLICATIONS

Lance, Coincidence Errors in a Cloud Droplet Probe (CDP) and a Cloud and Aerosol Spectrometer (CAS), and the Improved Performance of a Modified CDP, Journal of Atmospheric and Oceanic Technology, vol. 29, pp. 1532-1541, Oct. 2012.
(Continued)

*Primary Examiner* — Michael J Zanelli

(57) ABSTRACT

Data including current locations of candidate clouds to be seeded is obtained; based on same, a vehicle is caused to move proximate at least one of the candidate clouds to be seeded. Weather and cloud system data are obtained from a sensor suite associated with the vehicle, while the vehicle and sensor suite are proximate the at least one of the candidate clouds to be seeded. Vehicle position parameters are obtained from the sensor suite associated with the vehicle. Based on the weather and cloud system data and the vehicle position parameters, it is determined, via a machine learning process, which of the candidate clouds should be seeded, and, within those of the candidate clouds which should be seeded, where to disperse an appropriate seeding material. The vehicle is controlled to carry out the seeding on the candidate clouds to be seeded, in accordance with the determining step.

26 Claims, 9 Drawing Sheets

Related U.S. Application Data continuation of application No. 15/944,437, filed on Apr. 3, 2018, now Pat. No. 10,888,051.

(60) Provisional application No. 62/484,043, filed on Apr. 11, 2017.

(51) Int. Cl.
*G05D 1/689* (2024.01)
*G08G 5/76* (2025.01)

(56) References Cited

U.S. PATENT DOCUMENTS

| | | | | |
|---|---|---|---|---|
| 4,096,005 | A * | 6/1978 | Slusher | A01G 15/00 149/19.6 |
| 4,141,274 | A * | 2/1979 | Gerber | B64D 1/04 89/1.51 |
| 4,470,544 | A * | 9/1984 | Bronicki | A01G 15/00 417/331 |
| 4,600,147 | A * | 7/1986 | Fukuta | A01G 15/00 239/14.1 |
| 5,174,498 | A * | 12/1992 | Popovitz-Biro | A01G 15/00 516/6 |
| 5,357,865 | A * | 10/1994 | Mather | A01G 15/00 252/194 |
| 5,492,274 | A * | 2/1996 | Assaf | A01G 15/00 114/244 |
| 5,984,239 | A * | 11/1999 | Chen | B64D 27/24 73/170.27 |
| 9,589,473 | B1 * | 3/2017 | Seo | G01S 13/953 |
| 10,375,900 | B2 * | 8/2019 | Alfano | A01G 15/00 |
| 10,888,051 | B2 | 1/2021 | DeFelice et al. | |
| 11,882,798 | B2 | 1/2024 | DeFelice et al. | |
| 2005/0056705 | A1 * | 3/2005 | Bhumibol Adulyadej | A01G 15/00 239/2.1 |
| 2009/0177569 | A1 * | 7/2009 | Bowers | G06Q 40/08 705/35 |
| 2010/0001089 | A1 * | 1/2010 | Vazquez Serrano | B64D 1/16 239/14.1 |
| 2010/0071771 | A1 * | 3/2010 | Chan | E04H 12/02 52/84 |
| 2012/0241554 | A1 * | 9/2012 | Davidson | A01G 15/00 244/33 |
| 2014/0145002 | A1 * | 5/2014 | Caldeira | H05F 7/00 239/14.1 |
| 2014/0224894 | A1 * | 8/2014 | MacDonald | F03D 7/048 239/14.1 |
| 2014/0324352 | A1 * | 10/2014 | Hamann | G01W 1/10 702/3 |
| 2015/0359184 | A1 * | 12/2015 | Goelet | B64B 1/22 244/30 |
| 2016/0165813 | A1 * | 6/2016 | Wilkins | A01G 15/00 239/14.1 |
| 2016/0299254 | A1 * | 10/2016 | Martínez De La Escalera | G01W 1/08 |
| 2017/0217587 | A1 * | 8/2017 | Goelet | B64D 39/06 |
| 2017/0303479 | A1 * | 10/2017 | Su | A01G 15/00 |
| 2018/0065753 | A1 * | 3/2018 | Schwichtenberg | B64D 15/16 |
| 2018/0190132 | A1 * | 7/2018 | Cronkhite | G08G 5/0026 |
| 2020/0178481 | A1 * | 6/2020 | Cardi | A01G 15/00 |
| 2020/0196539 | A1 * | 6/2020 | Cardi | F42B 12/70 |

FOREIGN PATENT DOCUMENTS

| | | | |
|---|---|---|---|
| FR | 2167266 | B1 | 8/1973 |
| FR | 2190353 | A1 | 2/1974 |
| FR | 2267696 | A1 | 11/1975 |
| FR | 2385075 | A1 | 10/1978 |
| FR | 2394979 | A1 | 1/1979 |
| FR | 2468300 | A1 | 5/1981 |
| GB | 1110768 | A | 4/1968 |
| WO | 2010071305 | A2 | 6/2010 |

OTHER PUBLICATIONS

Beswick et al., The backscatter cloud probe—a compact low-profile autonomous optical spectrometer, Atmospheric Measurement Techniques 7, pp. 1443-1457, 2015.
Lawson et al., An overview of microphysical properties of Arctic clouds observed in May and Jul. 1998 during FIRE ACE, J. Geophysical Research, vol. 106 (D14), pp. 14989-15014, Jul. 2001.
DeFelice, American National Standards Institute, American Society Civil Engineers, & Environmental Water Resources Institute Standard Practice guideline for the design and operation of supercooled fog dispersal programs (44-13), ASCE, Reston, VA.
Langerud, ASCE Standard Practice for the Design and Operation of Hail Suppression Projects (39-15), ASCE, Reston, VA.
DeFelice, ASCE Standard Practice for the Design and Operation of Precipitation Enhancement Projects (42-17), ASCE/EWRI, Reston, VA.
DeFelice et al., Extra area effects of cloud seeding—an updated assessment, Atmospheric Research, 135, pp. 193-203, Jan. 2014.
Keyes, et al., Guidelines for cloud seeding to augment precipitation, 3rd edition, ASCE Manuals and Reports on Engineering Practice No. 81, ASCE, Reston, VA, USA (220 pp.) 2016.
DeFelice, T.P., A high-level atmospheric management program plan for the new millennium, J. Weather Modification, 34, 94-99 (2002)(hereinafter "DeFelice 2002").
Golden et al. Towards a new paradigm for weather modification science and technology, The Journal of Weather Modification, 38 (1), pp. 105-117, Apr. 2006.
Axisa et al., Modern and prospective technologies for weather modification activities: a look at integrating unmanned aircraft systems, Atmospheric Research, 178-179, pp. 114-124, Sep. 2016.
DeFelice et al., Developing the framework for integrating autonomous unmanned aircraft systems into cloud seeding activities, Journal of Aeronautics & Aerospace Engineering, 5(3), pp. 1-6, 2016.
Dydek et al., Adaptive Control of Quadrotor UAVs: A design trade study with flight evaluations, IEEE Transactions on Control Systems Technology, vol. 21, No. 4, pp. 1400-1406, Jul. 2013.
Cooper et al., Calculations pertaining to hygroscopic seeding with flares, Journal Applied Meteorology, 36(11), pp. 1449-1469, Nov. 1997.
Rosenfeld et al., A quest for effective hygroscopic cloud seeding, Journal of Applied Meteorology and Climatology 49 (7) pp. 1548-1562, Jul. 2010.
Gao, R.S. et al., "A light-weight, high-sensitivity particle spectrometer for PM2.5 aerosol measurements," Aerosol Science and Technology, 50:1, 88-99 (2016)(hereinafter "Gao et al 2016").
Carrasco et al., A one-dimensional ice structure built from pentagons, Nature Materials, vol. 8, May 2009, pp. 427-431.
Lou et al., A comparative study on preparation of TiO2 Pellets as photocatalysts based on different precursors, Materials Science Forum 2005, vol. 475, pp. 4165-4170 (Abstract Only).
Zhang et al., Photocatalytic TiO2/adsorbent nanocomposites prepared via wet chemical impregnation for wastewater treatment: a review, Applied Catalysis A: General, 371, Aug. 1-9, 2009.
Hill et al., A balloon-borne instrument for the measurement of vertical profiles of supercooled liquid water concentration, Journal of Applied Meteorology, 19, pp. 1285-1292, Nov. 1980.
Hill et al., Laboratory calibration of a vibrating wire device for measuring concentrations of supercooled liquid water, Journal of Atmospheric and Oceanic Technology 6(6), pp. 961-970 Dec. 1989.
Hill, G.E., "Radiosonde supercooled liquid water detector," Final Report delivered in September to U.S. Cold regions Research & Engineering Lab., Hanover, NH for Contract DACA 89-84-C-0005 (1990), Atek Data Corp, 2300 Canyon Blvd., Boulder, CO 80302 (97 pp.) (hereinafter "Hill 1990").
Romatschke et al., Photogrammetric Analysis of Rotor Clouds Observed during T-REX, 97th American Meteorological Society Annual Meeting, Robert A. Houze, Jr. Symposium, #443, AMS, Boston. MA, Dec. 2017.

(56) References Cited

OTHER PUBLICATIONS

Bates et al., Measurements of atmospheric aerosol vertical distributions above Svalbard, Norway, using unmanned aerial systems (UAS), Atmospheric Measurement Techniques, 6, pp. 2115-2120, 2013.
Elston et al., The tempest unmanned aircraft system for in situ observations of tornadic supercells: design and VORTEX2 flight results, Journal of Field Robotics, 28(4), pp. 461-483, Jul. 2011.
Lin, Observations: the first successful typhoon eyewall-penetration Reconnaissance flight mission conducted by the unmanned aerial vehicle, Aerosonde, Bulletin of the American Meteorological Society 87, pp. 1481-1483, Nov. 2006.
Ramana et al., Albedo, atmospheric solar absorption and heating rate measurements with stacked UAVs, Quarterly Journal of the Royal Meteorological Society: A Journal of the atmospheric sciences, applied meteorology and physical oceanography, 133(629), pp. 1913-1931, Oct. 2007.
Dixon et al., Titan: thunderstorm identification tracking analysis and nowcasting a radar-based methodology, Journal Atmospheric and Oceanic Technology 10(6), Dec. 1993, pp. 785-797.
Shane Thomas, USPTO as ISA, Patent Cooperation Treaty International Search Report, PCT/US2018/026649, dated Aug. 9, 2018, 5 pages.
Shane Thomas, USPTO as ISA, Patent Cooperation Treaty Written Opinion, PCT/US2018/026649, dated Aug. 9, 2018, 11 pages.
Wikipedia, Artificial intelligence, downloaded Feb. 23, 2018, 51 pages.
Backscatter Cloud Probe (BCP) Specification Sheet, Rev B, Jul. 27, 2012, Droplet Measurement Technologies, 3 pages.
Backscatter Cloud Probe with Polarization Detection (BCPD) Specification Sheet, Rev A-2, Sep. 4, 2013, Droplet Measurement Technologies, 3 pages.
Cloud Droplet Probe CDP-2 Specification Sheet, Jun. 10, 2013, Droplet Measurement Technologies, 3 pages.
SPECinc., Cloud Extinctiometer web page http://www.specinc.com/cloud-extinctiometer, Stratton Park Engineering Company, downloaded Mar. 19, 2018, 2 pages.
SPECinc., Cloud Particle Imager (CPI) web page http://www.specinc.com/cloud-particle-imager, Stratton Park Engineering Company, downloaded Mar. 19, 2018, 3 pages.
Wikipedia, Coud Seeding, downloaded Feb. 23, 2018, 14 pages.
CWIP Fin web page http://www.raindynamics.com/public_html/Fin.html, downloaded Mar. 19, 2018, 2 pages.
CWIP web page http:/www.raindynamics.com/public_html/CWIP.html, downloaded Mar. 19, 2018, 3 pages.
Specinc, Dual-wavelength In Situ Cloud Lidar web page, http://www.specinc.com/in-situ-cloud-lidar, Stratton Park Engineering Company, downloaded Mar. 19, 2018, 3 pages.
Specinc, Hawkeye Combination Cloud Particle Probe web page, http://www.specinc.com/hawkeye-combination-cloud-particle_probe, Stratton Park Engineering Company, downloaded Mar. 19, 2018, 4 pages.
IceSight, Ice Protection Systems, AIMS Airborne Icing Measurement System web page, http://www.icesight.com/airborne-icing-measurement-system.php, downloaded Mar. 19, 2018, 3 pages.
IceSight, Ice Protection Systems, Runway Applications, Aircraft Application, Runway and Aircraft weather sensing technology web page, http://icesight.com/aircraft-applications.php, downloaded Mar. 19, 2018, 3 pages.
IDI Innovative Dynamics, Inc., Deicing Systems web page http://www.icingdynamics.com/deicing.html, downloaded Mar. 3, 2018, 1 page.
SPECinc., Instrument Package to Measure Volcanic Ash web page http://www.specinc.com/volcanic-ash-measurement, Stratton Park Engineering Company, 2 pages.
Wikipedia Machine learning, downloaded Feb. 23, 2018, 13 pages.
POPS (Portable Optical Particle Counter) Handix Scientific web page http://www.handixscientific.com/pops/, downloaded Mar. 21, 2018, 2 pages.
Super et al., Feasibility of Snowpack Enhancement from Colorado Winter Mountain Clouds: Emphasis on Supercooled Liquid Water and Seeding with Silver Iodide and Propane, Super Weather Consulting, LLC Final Report, Technical Services Center, Bureau of Reclamation, Sep. 30, 2005, 69 pages.
Wikipedia Unmanned aerial vehicle, downloaded Feb. 23, 2018, 18 pages.
Wikipedia Unmanned ground vehicle, downloaded Mar. 19, 2018, 11 pages.
Wikipedia, Weather modification, downloaded Feb. 23, 2018, 7 pages.
David Serke et al., Supercooled liquid water content profiling case studies with a new vibrating wire sonde compared to a ground-based microwave radiometer Atmospheric Research 149 (2014) 77-87.
Hill JD, Strommen ND, Sakamoto CM, Leduc SK. LACIE—An application of meteorology for United States and foreign wheat assessment. Journal of Applied Meteorology. Jan. 1980;19(1):22-34.
Hill GE. Analysis of supercooled liquid water measurements using microwave radiometer and vibrating wire devices. Journal of Atmospheric and Oceanic Technology. Oct. 1994;11(5):1242-52.
County of Los Angeles Weather Modification Project-Prepared by TRC for the County of Los Angeles Department of Public Works, Jul. 21, 2009, 111 pages.

* cited by examiner

FIG. 5A

CONCEPTUAL FUNCTIONAL CONFIGURATION OF AN 'INTELLIGENT' SYSTEM TO IDENTIFY, MONITOR AND EVALUATE CLOUD SEEDING OR WEATHER MODIFICATION PROGRAMS VIA AIRBORNE AND GROUND APPROACHES

| FUNCTION | CAPABILITY | | |
| --- | --- | --- | --- |
| | AIRBORNE-NO SEED | AIRBORNE-SEED | GROUND-BASED-BOTH |
| Sensing | Atmospheric profiles surface to flight-level: air temperature, dewpoint temperature, wind field, turbulence, static pressure, spectral irradiance, supercooled liquid water content (SLW) Atmospheric constituents (aerosols, cloud, precipitation, trace gases, total water content, electrical properties) Surface characteristics (temperature, moisture content, spectral reflectance, soil moisture, soil temperature profiles) Ancillary, auxiliary (e.g. GPS, platform velocity, acceleration, attitude, pitch, roll, video) | Atmospheric profiles surface to flight-level: air temperature, dewpoint temperature, wind field, turbulence, static pressure, spectral irradiance, supercooled liquid water content (SLW) Atmospheric constituents (aerosols, cloud, precipitation, trace gases, total water content, electrical properties) Surface characteristics (temperature, moisture content, spectral reflectance, soil moisture, soil temperature profiles) Ancillary, auxiliary (e.g. GPS, platform velocity, acceleration, attitude, pitch, roll, video) | Atmospheric profiles surface to flight-level: air temperature, dewpoint temperature, wind field, turbulence, static pressure, spectral irradiance, supercooled liquid water content (SLW) Atmospheric constituents (aerosols, cloud, precipitation, trace gases, total water content, electrical properties) Surface characteristics (temperature, moisture content, spectral reflectance, soil moisture, soil temperature profiles) Ancillary, auxiliary (e.g. Elevation, GPS with Atmos. delay, video; local meteorology and radar data) |
| Sensor Coverage | Omni-slight skew toward forward hemisphere; Sub-UAS point^ | Omni-slight skew toward forward hemisphere; Sub-UAS point^ Seeding System-AgI; DryIce; micro-/nanoparticles depending on the seeding dispenser system design and intelligent platform attributes | Omni-slight skew toward upwind hemisphere; Zenith point#; ground near system Seeding System (AgI; DryIce; micro-/nano-particles depending on the seeding dispenser system design and intelligent platform attributes) |

| | | | |
|---|---|---|---|
| Data Management | Able to process hundreds of Terabytes of data per second; functional tools, decision support; calibration/validation; archive. Algorithms to yield required information: Capability Maturity Model Integration, level III (CMMI III). Command, Control, Communications, Computers, Intelligence, Surveillance, and Reconnaissance (C4ISR); data logging; data processing; Algorithms to yield required information (e.g. seeding decision), control operations (e.g. ignite squib-burn AgI solution/flare or other, flight path, sensing; data logging; data processing). | Able to process hundreds of Terabytes of data per second; functional tools, decision support; calibration/validation; archive Seed start and stop, GPS locations, amount AgI/DI dispensed. Algorithms to yield required information: Capability Maturity Model Integration, level III (CMMI III). Command, Control, Communications, Computers, Intelligence, Surveillance, and Reconnaissance (C4ISR); data logging; data processing; Algorithms yield required information (e.g. seeding decision), control operations (e.g. ignite squib-burn AgI solution/flare or other, flight path, sensing; data logging; data processing). | Able to process hundreds of Terabytes of data per second; functional tools, decision support; calibration/validation; archive. Algorithms to yield required information: Capability Maturity Model Integration, level III (CMMI III). Command, Control, Communications, Computers, Intelligence, Surveillance (C4IS); data logging; data processing; Algorithms to yield required information (e.g. seeding decision), control operations (e.g. ignite squib-burn AgI solution/flare tree flares or other, sensing; data logging; data processing). |
| Seeding System | Depends on Program requirements | AgI, dry ice (DI), hygroscopic agent dispenser, and/or latest seeding materials (i.e., micro-/nanoparticles) depending on the seeding dispenser system design and intelligent platform attributes. | AgI, dry ice (DI), hygroscopic agent dispenser, and/or latest seeding materials (i.e., micro-/nanoparticles) depending on the seeding dispenser system design and intelligent platform attributes. |

~Sub-UAS Point is defined as the "point of intersection with the earth's surface-geoid of a plumb line from the UAS to the center of the Earth" (i.e., intersects surface at a 90 degree angle).
\# Zenith Point is defined as the "point of intersection at a 90 degree angle with the earth's surface-geoid of a plumb line from the system toward the top of the Earth's atmosphere."

FIG. 6

LIGHTWEIGHT AND COMPACT SENSORS FOR 'INTELLIGENT' SYSTEM SENSOR PAYLOAD

| INSTRUMENT | MEASUREMENTS | WEIGHT (kg) | DIMENSIONS (mm) |
|---|---|---|---|
| Multi-angle inertial probe (MIP) | Temperature, relative humidity, pressure, 3D wind components (u, v, w) | 0.3 | 240 X 100 X 100 |
| Back scatter cloud probe (BCP) | Drop size distribution (5 to 75 μm) | 1.5 | 117 X 107 X 45 |
| Printed optical particle spectrometer (POPS) | Aerosol size distribution (0.14 to 3 μm) | 0.8 | 170 X 60 X 60 |

FIG. 7

HOW EMBODIMENTS OF THE INVENTION OVERCOME SOME EFFECTIVENESS-LIMITING SHORTCOMINGS OF CURRENT CLOUD SEEDING ACTIVITIES

| CURRENT WEATHER MODIFICATION/ CLOUD SEEDING ACTIVITIES | EMBODIMENTS OF THE INVENTION |
|---|---|
| (a) Complexity of the cloud systems and their interactions with their surrounding environment. | Standard sensor payload contains environmental sensors. These sensors will also be NIST calibrated and correlated with more conventional versions to ensure 'true' data of the measured environmental attributes and linkage to the contemporary activities (i.e., comparability; maintain statistical integrity) |
| (b) Readiness of the technologies to sense the environment to be treated under weather modification activities is inadequate. | One or more embodiments use near operational technologies, and provide a mechanism to ensure they are ready for operational use. One or more embodiments also provide for the ability to develop its technologies and to integrate the latest technologies independent of their use. |
| (c) Insufficient data for effective operations and their evaluation (i.e., remote areas are data starved and measurement systems are costly and logistically involved). | Data are obtained in situ on both seed platform and from other platforms, and are used to guide seeding and/or as required. They supplement existing measurement infrastructure. These data are archived for later use. They are a standard part of the 'Intelligent' System, so no added cost to obtain these measurements. |

| | |
|---|---|
| (d) Measurements not made at an adequate spatial and temporal frequency to satisfactorily reproduce their true natural state, and<br>(e) the sensors themselves are designed to measure a dependent variable (e.g., liquid water content). | Absolute value, representative measurements are made in near real-time, especially inside the cloud. The derived quantities will thence reflect the system itself to be/is being seeded. The data will not be old values (i.e., their time stamp is significantly offset from the operational seeding time), and will also be representative with respect to cloud processes) in comparison to current cloud seeding programs. |
| (f) Safety concern (e.g., icing, crash) | First, engineering trade studies and integration process based on industry proven practices adapted for this application integrate and thoroughly test new technologies. This includes technology for deicing unmanned platforms, which is commercially available. Second, these systems are not manned. While there are always risks, those from using embodiments of this invention are far less threatening. |
| (g) Randomized seeding | One or more embodiments also include built-in, ability to conduct randomized seeding (operations or experiments). By using inventive techniques involving, e.g., radar and/or UAV(s), candidate clouds are chosen with little human bias, if any, and then seeded randomly again with little, if any, human bias. |
| (h) Require extra funding for Research and Development of its technologies or the purchase of extra occasional use equipment to gather enough data to help overcome (a)-(g). | The need for extra funding is minimal, if at all needed, due to the routine acquisition, use, and storage of 'in situ' environmental measurements. |

INTELLIGENT SYSTEMS FOR WEATHER MODIFICATION PROGRAMS

CROSS-REFERENCE TO RELATED APPLICATIONS

This application is a continuation of U.S. patent application Ser. No. 17/106,159 filed Nov. 29, 2020, the complete disclosure of which is expressly incorporated herein by reference in its entirety for all purposes, which is in turn a continuation of U.S. patent application Ser. No. 15/944,437 filed Apr. 3, 2018, now U.S. patent Ser. No. 10/888,051, the complete disclosure of which is also expressly incorporated herein by reference in its entirety for all purposes, which application Ser. No. 15/944,437 in turn claims the benefit of U.S. Provisional Application Ser. No. 62/484,043, filed on 11 Apr. 2017, the complete disclosure of which is also expressly incorporated herein by reference in its entirety for all purposes.

BACKGROUND

Aspects of the invention relate to weather modification; manned and/or unmanned aircraft and/or ground vehicles, including but not limited to unmanned aircraft vehicles (UAVs, also known as "unmanned aerial vehicles"); artificial intelligence; machine learning; and the like.

Weather modification refers to intentionally manipulating or altering the weather; the most common form of weather modification is cloud seeding to increase rain or snow. Cloud seeding involves dispersing substances into the air that serve as cloud condensation or ice nuclei. Cloud seeding can be done, for example, by ground generators, ground-based flare trees, plane, or rocket.

An unmanned aircraft vehicle or UAV, commonly known as a "drone," is an aircraft without a human pilot aboard. UAVs are a component of an unmanned aircraft system (UAS); such systems typically include a UAV, a ground-based controller, and a system of communications between the two. The flight of UAVs may operate with various degrees of autonomy: either under remote control by a human operator or autonomously by onboard computers.

Artificial intelligence (AI) or machine intelligence (MI) is intelligence demonstrated by machines, in contrast to the natural intelligence (NI) displayed by humans and other animals. Machine learning is a field of computer science that gives computer systems the ability to progressively improve performance on a specific task with data, without being explicitly programmed.

SUMMARY

Aspects of the invention provide intelligent systems for weather modification programs. In one aspect, an exemplary method includes obtaining data including current locations of candidate clouds to be seeded; based on the data including the current locations of the candidate clouds to be seeded, causing a vehicle to move proximate at least one of the candidate clouds to be seeded; obtaining, from a sensor suite associated with the vehicle, while the vehicle and sensor suite are proximate the at least one of the candidate clouds to be seeded, weather and cloud system data; and obtaining vehicle position parameters from the sensor suite associated with the vehicle. The method further includes, based on the weather and cloud system data and the vehicle position parameters, determining, via a machine learning process, which of the candidate clouds should be seeded, and, within those of the candidate clouds which should be seeded, where to disperse an appropriate seeding material. The method further includes controlling the vehicle to carry out the seeding on the candidate clouds to be seeded, in accordance with the determining step.

In another aspect, another exemplary method includes obtaining, from a ground-based sensor suite including a plurality of sensors, associated with a ground-based seeding suite including a plurality of seeding apparatus, weather and cloud system data; based on the weather and cloud system data, determining, via a machine learning process, which individual ones of the ground-based seeding apparatus to activate, and when; and sending control signals to the individual ones of the ground-based seeding apparatus, to cause same to emit seeding material, in accordance with the determining step.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects, as will be appreciated by the skilled artisan. One or more embodiments base cloud seeding decisions on more relevant cloud and environmental data, as compared to prior art techniques, thereby more accurately placing seeding material, obtaining better cloud seeding results, and the like. Refer also to FIG. 7 and accompanying text.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 5A and 5B (collectively, "FIG. 5") present a table detailing an exemplary conceptual functional configuration of an 'Intelligent' System to identify, monitor and evaluate cloud seeding and/or weather modification programs via airborne and ground approaches, according to an aspect of the invention;

FIG. 6 presents a table detailing exemplary lightweight and compact sensors for an 'Intelligent' System Sensor payload, according to an aspect of the invention;

FIG. 7 presents a table demonstrating non-limiting examples of how embodiments of the invention overcome some effectiveness limiting shortcomings of current cloud seeding activities.

DETAILED DESCRIPTION

Figure 1:
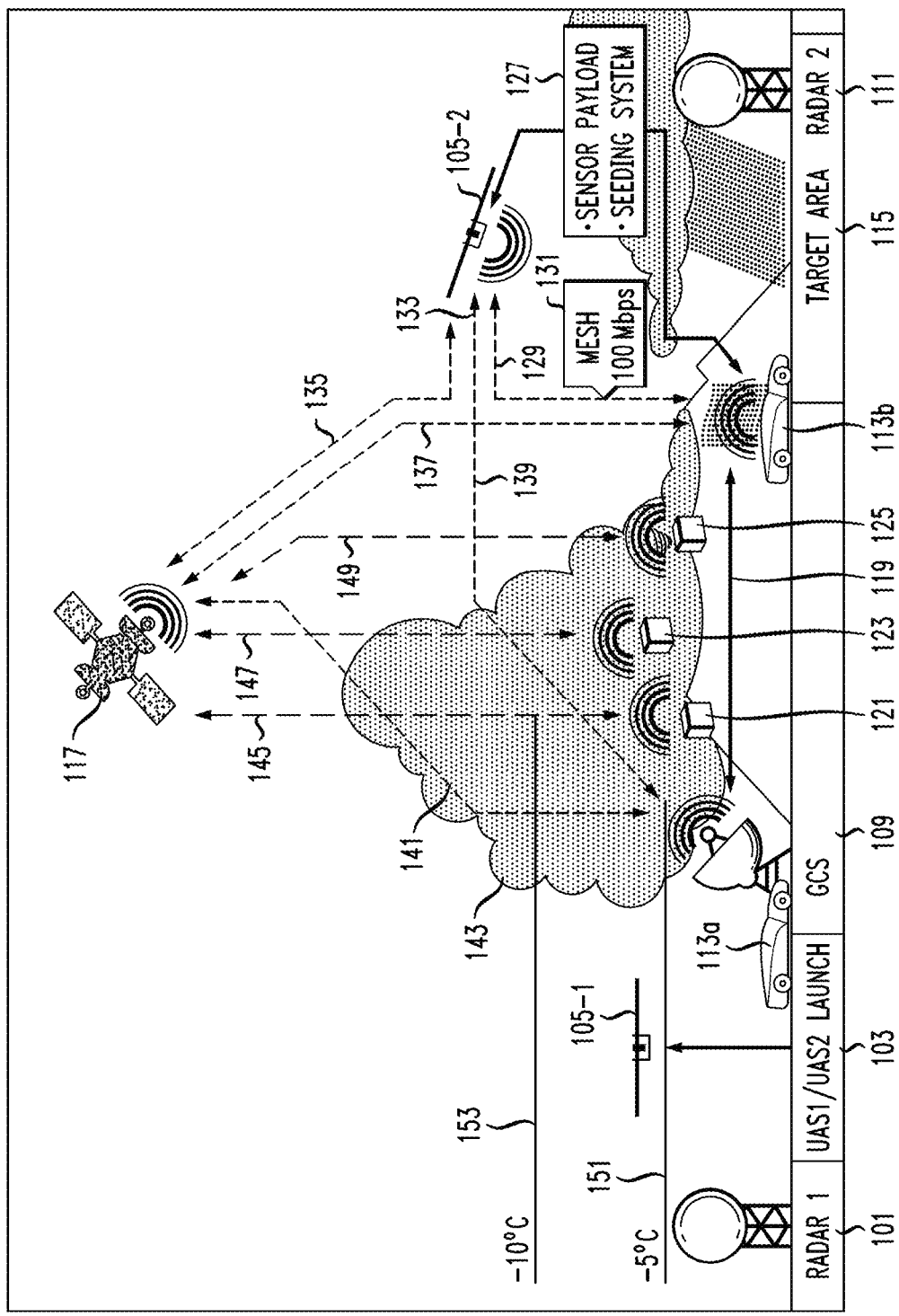
FIG. 1 is a conceptual rendering of 'Intelligent' Systems for weather modification (advertent or inadvertent) and cloud seeding programs and/or activities, according to an aspect of the invention.

Aspects of the invention provide techniques for conducting cloud seeding, advertent and/or inadvertent weather modification programs and/or activities. At least some embodiments provide an advanced engineering-science-based method adapted to enhance the safety of, plus, lower the footprint and cost of, contemporary weather modification (advertent and inadvertent), and/or cloud seeding operational and research programs or activities, while optimizing their effectiveness (compared to contemporary cloud seeding programs).

At least some embodiments advantageously use the information from on-system sensors to guide seeding action, i.e., employ adaptive control. Indeed, one or more embodiments focus on using 'Intelligent' Systems, with adaptive control and functional capabilities as disclosed herein, for weather modification and cloud seeding programs and activities configured as defined by a specified program requirement. At least some embodiments employ a ground-based 'Intelligent' System for seeding fog or airborne 'Intelligent' System for seeding low base stratiform clouds, elevated stratiform clouds and convective clouds.

It is worth noting that one or more embodiments further enhance current techniques and/or systems. For example, one current project involving potentially pertinent sensors and/or components suitable for use in connection with unmanned systems mentioned herein includes, e.g., Navy-funded Innovative Dynamics, Inc. SBIR/STTR-funded Phase II award, entitled "Atmospheric Icing Conditions Measurement System (AiMS)." Reference is made to the IceSight Ice Protection System Airborne Icing Measurement System (AIMS) available from Innovative Dynamics Inc., Ithaca, NY, USA. For UAVs, the Cloud Water Inertial Probe (CWIP) sensor of Rain Dynamics provides in-situ meteorological information for manned and unmanned aircraft. Reference is made to the Cloud water inertial probe (CWIP) and the CWIP Fin available from Rain Dynamics LLC of Boulder, CO, USA. Other useful devices are available from Droplet Measurement Technologies of Longmont, CO, USA; for example, the Cloud Droplet Probe is a useful instrument on large and mid-sized UAVs. Refer to Sara Lance, Coincidence Errors in a Cloud Droplet Probe (CDP) and a Cloud and Aerosol Spectrometer (CAS), and the Improved Performance of a Modified CDP, JOURNAL OF ATMOSPHERIC AND OCEANIC TECHNOLOGY, volume 29, pages 1532-1541, October 2012 (hereinafter "Lance 2012"), hereby expressly incorporated by reference herein in its entirety for all purposes, although the skilled artisan will be generally familiar with same. The Droplet Measurement Technologies back-scatter cloud probe with polarization detection (BCPD) instrument has significant potential for icing detection with UAVs. Reference is made to K. Beswick et al., The backscatter cloud probe—a compact low-profile autonomous optical spectrometer, Atmos. Meas. Tech. 7, 1443-1457, 2015 (hereinafter "Beswick et al. 2014"), hereby expressly incorporated by reference herein in its entirety for all purposes, although the skilled artisan will be generally familiar with same. Stratton Park Engineering Company (SPEC Inc.) of Boulder, CO, USA is miniaturizing its cloud particle imager (CPI) and its other cloud spectrometers for use on UAVs. Refer to R. Paul Lawson et al., An overview of microphysical properties of Arctic clouds observed in May and July 1998 during FIRE ACE, J. Geophys. Res. 106 (D14), 14989-15014, Jul. 27, 20101, (hereinafter "Lawson et al. 2001"), hereby expressly incorporated by reference herein in its entirety for all purposes, although the skilled artisan will be generally familiar with same. Given the teachings herein, the skilled artisan will be able to employ elements and/or components mentioned herein, and the like, to obtain at least a portion of atmospheric and/or environmental information used by our one or more embodiments.

Some systems combine ground-based sensors with models and satellite retrieved information. Meteorologists and analysts determine the best locations for seeding based on available nearby data and under what conditions that material will yield precipitation that reaches the target area, and conceivably when to turn the generators on/off. In current systems, the ground-based icing rate sensor, satellite data and the satellite retrieved information are typically not representative of the part in the cloud that is relevant or relatable to where the information is needed to determine when seeding should start and/or stop or to evaluate seeding actions. One or more embodiments automatically measure such information more accurately and from a more relevant location and use same to automatically initiate the seeding. At least some embodiments use this information to help ensure optimal effectiveness and efficiency in near-real-time; automatically.

One or more embodiments provide a methodology to improve the performance and evaluation of weather modification or cloud seeding programs or activities using adaptive autonomous control of airborne and ground seeding systems, and prudently participate in solutions to mitigate inadvertent weather modification.

Weather modification or cloud seeding projects are typically implemented on cloud systems or portions of clouds that are naturally inefficient at converting their moisture into precipitation on the ground targeted to fall in a defined area. Cloud seeding is intended to make clouds more efficient precipitators independent of the cause behind the inefficiency. Cloud seeding has evolved to work effectively on cloud systems that contained the ideal range of conditions conducive to the use of cloud seeding technology. Contemporary cloud seeding technologies may be effectively applied to facilitate the water cycle efficiency. See, e.g.:

DeFelice, T. P. (Ed.), American National Standards Institute, American Society Civil Engineers, & Environmental Water Resources Institute Standard Practice guideline for the design and operation of supercooled fog dispersal programs (44-13), ASCE, Reston, VA, USA (hereinafter ANSI/ASCE/ EWRI 2013); Langerud, D. (Ed.), ASCE Standard Practice for the Design and Operation of Hail Suppression Projects (39-15), ASCE, Reston, VA, USA (hereinafter ANSI/ASCE/ EWRI 2015); DeFelice, T. P. (Ed.), ASCE Standard Practice for the Design and Operation of Precipitation Enhancement Projects (42-17), ASCE/EWRI, Reston, VA, USA (hereinafter ANSI/ASCE/EWRI 2017); DeFelice, T. P. et al., Extra area effects of cloud seeding—an updated assessment, Atmos. Res. 135-6, 193-203, 2014 (hereinafter DeFelice et al. 2014); Keyes, C. G. et al., Guidelines for cloud seeding to augment precipitation, 3rd edition, ASCE Manuals and Reports on Engineering Practice NO. 81, ASCE, Reston, VA, USA (220 pp.) (hereinafter Keyes et al 2016), the complete disclosures of all of which are expressly incorporated by reference herein in their entireties for all purposes, although the skilled artisan will be generally familiar with same. Weather modification programs are conducted across the globe in regions where clouds have conditions amenable to the use of weather modification technologies via glaciogenic seeding agents, or hygroscopic or warm cloud seeding agents.

Operational cloud seeding projects have been conducted since the first tests of cloud seeding agents, also called glaciogenic seeding agents (i.e., dry ice and silver iodide, AgI), in the middle 1940s. Cloud seeding for enhancing winter snowpack in western United States (US) mountainous areas is considered highly successful since the mid-1980s. Scientists assess the increase in precipitation amount at generally up to a 10% increase compared to nature using glaciogenic seeding materials, especially silver iodide (AgI) complexes. Clouds considered too warm for glaciogenic seeding, or warm clouds, can also be seeded. This is commonly referred to as hygroscopic seeding. The results of warm cloud seeding or hygroscopic seeding are favorable but still inconclusive. The results of seeding mixed phase convective clouds have been mixed and often inconclusive. The seeding of isolated individual clouds has led to definite, mostly positive changes in the precipitation amounts. Statistical and computer-based methods have evolved to minimize the noise introduced by the complexity of these systems and by the statistically small number of events for the objective evaluation of operational cloud seeding effectiveness. The environmental impact from using contemporary glaciogenic seeding agents is minimal, if any. The environmental impact from using contemporary hygroscopic seeding agents is also minimal at this time.

Current cloud seeding programs may provide about a 10% increase in the precipitation amount (compared to normal) under certain glaciogenic seeding applications. The percentage increase has a large uncertainty and also is not likely higher due primarily to the following factors; (a) complexity of the cloud systems and their interactions with their surrounding environment, (b) the readiness of the technologies to sense the environment to be treated under weather modification activities is inadequate, (c) insufficient data, (d) measurements not made at an adequate spatial and temporal frequency to satisfactorily reproduce their true natural state, and (e) the sensors themselves are designed to measure a dependent variable. For example, an instrument measures liquid water content using a standard liquid water content probe. Liquid water content can be the same value for two clouds to be seeded, even though the cloud drop sizes are different. The latter adds risk to the successful result of the operation if the seeding strategy doesn't adequately match with the true cloud microstructure or its droplet population characteristics.

Manned aircraft are the most common platform for cloud seeding. Manned aircraft do enable access to remote areas, despite; (i) their high cost to operate and to maintain, and (ii) difficulties related to their operational risks, i.e., use in icing conditions and mountainous terrain. Furthermore in this regard, there is also pilot risk associated with use of manned aircraft for cloud seeding. One or more embodiments advantageously enhance pilot safety by reducing or eliminating the need for manned flights and/or by enhancing the effectiveness of manned flights and thereby reducing the number of manned flights required. Current cloud seeding or weather modification programs do not use heavily instrumented aircraft to conduct operations, unless there is a special research effort tied to the program. Even during a research program this information is not used operationally, except as it applies to the research. In the airborne case, one or more embodiments employ manned and unmanned aircraft, with instrumentation and adaptive autonomy. In one or more embodiments, the system's sensor payload is a pertinent part of this methodology and its successful implementation. The cost to secure the manned seed aircraft, its seeding system and an instrumented aircraft to support research and development cost is high. They also have high maintenance costs and there are costs to certify each for flight.

In contrast, current ground seeding systems are many orders of magnitude less costly to obtain and maintain. Ground seeding system deployment and operation can occasionally be a challenge. For example, their siting requires modeling to ensure the seeding material gets into the appropriate clouds (e.g., Keyes et al 2016), especially in mountainous, hilly, and lightly vegetated, if any, arid terrain. In one or more embodiments, the use of 'Intelligent' Systems on the ground provides additional, often unavailable, environmental data and operational seeding guidance similar to airborne 'Intelligent' System platforms, to in turn provide enhanced and even optimal system performance and seeding effectiveness.

The shortcomings that plague current weather modification programs/cloud seeding programs can be minimized through research and development programs directed toward optimizing current technologies used to manage "treatable" atmospheric processes. See, e.g., DeFelice, T. P., A high-level atmospheric management program plan for the new millennium, J. Weather Modification, 34, 94-99 (2002) (hereinafter "DeFelice 2002") and Golden, J. et al. Toward a new paradigm in weather modification research and technology, J. Weather Modification, 38, 105-117 (2006)(hereinafter "Golden and DeFelice 2006"), the complete disclosures of both of which are expressly incorporated by reference herein in their entireties for all purposes, although the skilled artisan will be generally familiar with same. However, besides adding significant cost, most program sponsors obtain sufficient benefit from employing the current technology. Hence, research and development funding remains scarce at best.

One or more embodiments advantageously overcome the data gap required to identify suitable clouds and to more smartly seed them such that the result is positive in the indicated target area. One or more embodiments advantageously improve the following and/or improve other aspects reducing the need to improve the following: the seeding materials, the methodology for conducting weather modification activities, the technologies (e.g., seeding system, models, decision support tools, data processing system), for integrating new, ancillary and/or auxiliary technologies (i.e., improved and/or new more efficient technologies). The latter may require novel ways to apply the improved technologies operationally. Disclosed herein is guidance for implementing one or more embodiments to conduct weather modification and cloud seeding program/activity operations and their evaluation. The guidance will also help the skilled artisan to keep the cost of one or more embodiments equivalent to or even less than that for current cloud seeding activities.

Axisa, D. and DeFelice, T. P., Modern and prospective technologies for weather modification activities: a look at integrating unmanned aircraft systems, Atmos. Res., 178-9, 114-124 (2016)(hereinafter, "Axisa and DeFelice 2016") and DeFelice, T. P. and Axisa, D., Developing the framework for integrating autonomous unmanned aircraft systems into cloud seeding activities, J. Aeronautics & Aerospace Engineering, 5:172, 001-006 (hereinafter, "DeFelice and Axisa 2016") both provide background information, and the complete disclosures of both are expressly incorporated by reference herein in their entireties for all purposes, although the skilled artisan will be generally familiar with same. One or more embodiments expand capabilities of unmanned systems to address, e.g., cloud seeding operations involving seedable clouds with high cloud bases (more than 3,000 m above ground level), and/or intense updrafts and turbulence.

One or more embodiments employ airborne (i.e., fixed wing), ground-based and other 'Intelligent' Systems for precipitation enhancement and augmentation and hail suppression. Some embodiments use a ground-based 'Intelligent' System for weather modification and cloud seeding programs involving seeding of fog, low-based stratiform clouds (i.e., bases at about 3,000 m above ground level and lower) and orographic clouds. Some embodiments use an airborne 'Intelligent' System, and/or a ground-based 'Intelligent' System, for low-based stratiform clouds, elevated stratiform clouds, orographic clouds or convective clouds depending on program requirements. One or more embodiments also provide a comparatively more developed data management, adaptive autonomy, 'machine-learning' as defined herein, and corresponding software framework, which enhances a foundation set by DeFelice and Axisa 2016, as compared to current cloud seeding program components, and the entities discussed elsewhere herein.

One or more embodiments provide a paradigm-shifting methodology and framework for using 'Intelligent' Systems during the performance (i.e., identify, conduct, monitor) and evaluation of weather modification, cloud seeding and inadvertent weather modification programs/activities. One or more embodiments provide guidance for optimal success and regular integration of newer technological capabilities designed to more cost-effectively achieve mission-driven objectives. One or more embodiments are independent of the detailed design of a particular kind of 'Intelligent' System'. Although the primary airborne 'Intelligent' System in one or more embodiments is fixed wing, disclosed herein are pertinent functional capabilities of the 'Intelligent' Systems needed to effectively use one or more embodiments, including the adaptive autonomy, from which the skilled artisan will be able to select a variety of suitable fixed or movable wing systems. In one or more embodiments, the system should be able to safely support its maximum weight at takeoff during the most extreme atmospheric environment as defined in the detailed description section. One or more embodiments provide a framework and methodology to enable effective and even optimal use during weather modification programs and/or activities.

'Intelligent Systems' are autonomous systems with adaptive control or are adaptive autonomous systems. Refer, for example, to Dydek Z. T. et al., Adaptive Control of Quadrotor UAVs: A design trade study with flight evaluations, IEEE Transactions on Control Systems Technology, 21(4), 1400-1406 (2013) (hereinafter "Dydek et al. 2013"), the complete disclosure of which is expressly incorporated by reference herein in its entirety for all purposes, although the skilled artisan will be generally familiar with same. These systems contain secure interfaces with their on-board sensor payload, communication, navigation, data management and software controlled components. They can typically also interface securely with other observing systems (for example, UAS/UGS) and/or other technologies to carry out required operational activities or to monitor and evaluate seeding operations. Autonomous systems could contain; autonomous unmanned aircraft or ground systems (UAS/UGS) with adaptive control, autonomous unmanned aircraft or ground vehicles (UAV/UGV) with adaptive control, unmanned aerial or ground systems (UAS/UGS) with or without adaptive control, unmanned aircraft or ground vehicles (UAV/UGV) with or without adaptive control, manned aircraft or ground systems, rocket delivery of seeding material with or without autonomy and/or with or without adaptive control, instrumented towers (including with a seeding system), ground-based seeding systems with or without adaptive remote controls, instrumented balloons (including with a seeding system), mobile and static observing systems equipped with seeding systems, and also any combination of these systems, not simply each in isolation (e.g. UAV swarm, ground-based networked system). Adaptive control refers to the improved performance and increased robustness of an autonomous system by configuring its control system to adjust the UAS/UGV seeding action as a function of measurements (i.e. in-situ or remote sensing of an atmospheric/environmental parameter(s)).

In one or more embodiments, the autonomous systems with adaptive control, or 'Intelligent Systems,' are guided by remote sensors (e.g., ground-based, including radar/radiometer, profilers, aircraft if available, and/or satellite), numerical weather prediction (NWP) models, and/or 'in-situ or 'Intelligent' System platform-based sensor(s) systems to provide target locations for the seeding, and contain a sensor suite (payload) that provides 'in-situ' atmospheric/environmental data needed to identify conditions suitable for seeding or other specified application. Each 'Intelligent' System seamlessly ingests, in near real-time, the sensor payload data (i.e., temperature, relative humidity, wind, updraft velocity, aerosol size distribution and droplet size distribution, and other as required), auxiliary/ancillary data (e.g., cloud locations, topography, seeding locations based on convection or other defined criteria, information from other 'Intelligent' Systems, satellites, radar, radiometer, data archives), NWP model data, seeding action data and autopilot or remote control data. The seeding action, where and when to seed, are determined by the seeding system software that extracts ancillary/auxiliary (or 'other data'), NWP model data and/or platform sensor data inputs. What seeding material to dispense, if not pre-determined, is determined by platform sensor data, NWP model data, and, as needed, auxiliary/ancillary data.

In one or more embodiments, all data are quality controlled using a simple test and processed in real time. Each 'Intelligent' System navigates toward candidate cloud areas (if mobile) or is activated to standby (if static), based on the location coordinates obtained from the auxiliary/ancillary data inputs and processed onboard and/or with the help of computers at the ground control station. The navigation or autopilot, or remote control (if ground-based) system, includes remote control or autopilot routine, software-in-the-loop (SIL) database, Mission Planner, radio telemetry and a central processing unit (CPU). The autopilot or remote control routine, SIL database and Mission planner, or an autonomous controller or equivalent, nowcasts ("nowcasting" refers to the detailed description of the current weather along with forecasts obtained by extrapolation for a period of 0 to 6 hours ahead) the real-time ingested ancillary/auxiliary location coordinates and platform sensor data. The output of the autonomy routine, or equivalent, is then fed back into the navigation (autopilot or remote control) that allows the system to automatically adapt its path accordingly with ongoing in-situ and remote sampling and NWP model guidance as it heads to the new locations. In one or more embodiments, the latter is continuously updated throughout the flight, and the system is capable for machine learning as described herein.

Once the 'Intelligent' System reaches an appropriate (preferably ideal) location, the adaptive navigation routine passes control and sensor data to the seeding system (i.e., seeding dispenser including seeding model and corresponding software), and seeding begins. Seeding starts and ends once the sensors indicate favorable and then unfavorable seeding conditions, respectively. The seeding cycle continues until the UAS must return for fueling or there is an unsafe situation, at which time a replacement system will be in place to continue the activity. Each 'Intelligent' System transmits all data to the ground control station (GCS) via telemetry for archive and computationally-intensive processing. The results from computationally-intensive processing, including the ensemble-like near-real-time prediction of the optimal adapted path(s) and optimal seeding location(s), rate(s), duration(s) and material(s), based on the 'in situ and remote sensor data, seed algorithm, SIL database predictions, NWP model predictions, and the like, are stored in the SIL database, validated, and sent back to the 'Intelligent' System data management system during its operation. Additionally, in the specific case of ground-based 'Intelligent' Systems, this includes which systems to turn on for seeding to ensure maximum effect and efficiency. In one or more embodiments, each 'Intelligent' System is able to communicate with others throughout a seeding program (a seeding program might last on the order of months or years, for example). Furthermore, in one or more embodiments, one or more intelligent systems are configured to communicate with other intelligent systems, ground control systems, and/or emergency management systems, and the like.

The 'Intelligent' Systems, if not ground-based, can be used individually, or in tandem (i.e., 2 or more), in a networked swarm, or in a manner that achieves concurrent Eulerian and/or Lagrangian data, with or without profiling, to appropriately meet the requirements of the seeding activity. They may be used in conjunction with current cloud seeding technologies. For example, some embodiments are employed using the airborne (not ground-based) 'Intelligent' Systems in weather modification and cloud seeding programs/activities designed for precipitation enhancement or augmentation and hail suppression. Similarly, some embodiments are employed using ground-based 'Intelligent' Systems in weather modification and cloud seeding programs/activities designed for fog dispersal and precipitation augmentation.

Similarly, ground-based (static, tethered, and mobile) 'Intelligent' Systems can be used individually, or in a network configured to ensure optimal coverage of the seeding material in the targeted cloud systems to ensure that the cloud system's precipitation fell into the targeted area. In one or more embodiments, the ground-based system has an autonomy component that is controlled remotely by NWP model guidance and its concurrent sensor payload. The latter identifies when cloud systems are seedable, turns on all, one or none of the systems as a function of the environmental conditions as measured or simulated, and continues the seeding operation until the conditions have ended. The NWP model guidance is based on the data from the intelligent ground systems (e.g. "nudging") as well as mesoscale and regional NWP models. That set of data is processed and used in near-real-time to optimally control the start- and stop-seeding actions as well as to control the type of material dispensed, and to keep track of the total amount dispensed. The latter is continuously updated in one or more embodiments, and the system is capable of machine learning as described herein. In one or more embodiments the system also provides alerts for reloading the seeding materials, and communicating extreme weather conditions. Once seeding ends, each system can typically continue to make measurements as required. Further, in at least some instances, non-seeding 'Intelligent' Systems in an array of ground-based 'Intelligent' Systems can be employed to collect data throughout the same period, concurrently with the systems that were seeding.

One or more embodiments employ improved technologies, detail the configuration of their interfaces, and allow those technologies and relevant software systems to evolve independently of their use. Refer to the table of FIG. 5. The latter contributes to more streamlined cloud seeding operations that have smaller operational footprints and costs (compared to contemporary cloud seeding programs), while enhancing or even optimizing their effectiveness. Furthermore, while at no additional cost, data at temporal and spatial sensitivities to overcome predictability or sparseness issues of environmental parameters that identify conditions suitable for seeding and how such might be implemented are readily available beyond their operational use. Management and implementation concepts for utilizing the described methodology are also provided herein.

Thus, one or more embodiments provide a paradigm-shifting methodology and framework for using 'Intelligent' Systems to identify, conduct, monitor and evaluate weather modification, cloud seeding and inadvertent weather modification activities. Refer to FIG. 1, which depicts an exemplary embodiment of the invention including a UAS 105-2, a UAS 105-1 (collectively 105), and two UGVs 113*a*, 113*b* (collectively 113), it being understood that manned aerial and/or ground vehicles could be used in other embodiments, and that fewer or more vehicles could be used; i.e., from one vehicle up to any desired number. The exemplary embodiment also includes conventional ground-based seeding systems or stationary UGVs 121, 123, 125, which could be used by themselves or in combination with the aerial and/or ground vehicles. In a non-limiting exemplary embodiment, the UAS 105-1, 105-2 are launched from launch area 103 and fly in tandem, and the UGVs 113*a*, 113*b* are stationary and/or are moved as needed; all work as a unit to ensure optimal targeting of candidate clouds 143 to in turn ensure that optimal results are achieved in the target area 115. In the non-limiting example of FIG. 1, each UAS 105-1, 105-2 and/or each UGV 113*a*, 113*b* has a similar payload 127 and endurance. The two UAS-es, i.e., UAS1 (105-2; e.g., above cloud formation level/spotter) and UAS2 (105-1, e.g., near cloud formation level/seeder) fly toward one or more initial target clouds that are heading toward the target area. A non-limiting exemplary payload is described in FIG. 6; each UAS/UGV can include a video camera as part of 127.

It is worth noting that, in conventional seeding operations, cloud targets are generally chosen visually by the meteorologist on the ground and/or the pilot in the aircraft. See, e.g., Keyes et al 2016 and ANSI/ASCE/EWRI 2017. In the UAS the meteorologist on the ground may not have a visual of the cloud target, and onboard video processing of cloud targets can identify cloudy regions using stereo photogrammetric analysis and automatic feature matching that reconstruct 3D cloud scenes. See Romatschke, U. et al. Photogrammetric Analysis of Rotor Clouds Observed during T-REX, 97th American Meteorological Society Annual Meeting, Robert A. Houze, Jr. Symposium, #443, AMS, Boston. MA, USA 2017 (hereinafter, "Romatschke et al. 2017"), the complete disclosure of which is expressly incorporated by reference herein in its entirety for all purposes, although the skilled artisan will be generally familiar with same. One or more embodiments make use of information from the sensors 127 (including video camera, and see also FIG. 6); from Radar 101, 111; and/or from satellite 117 via communication links 133, 135, 137. Communications links 145, 147, and 149 can be employed when ground-based systems 121, 123, 125 are utilized. Information from sensors on other UAS and/or UGVs can also be employed via links 129, 137, for example, as well as via a suitable link between UAVs 105-1 and 105-2 (omitted to avoid clutter). Suitable communication links can also be provided between the ground control station-GCS 109 and each UAS/UGV 105-2, 113*b*, 105-1, 113*a* and the satellite 117; see, e.g., communication links 119, 139, and 141. Communications links (omitted to avoid clutter) can also be provided between the GCS 109, UAS 105-1 and UGV 113*a*, for example. In an exemplary embodiment, the mesh network 131 between UAS1 and UAS2 is capable of 100 Mbps data rates while line-of-sight operations and beyond line of sight are capable of 56 kbps and 2.4 kbps, respectively, for example. This information is processed and/or stored on each UAS/UGV 105-1, 105-2, 113*a*, 113*b* and/or on processing systems in GCS 109. The UAS and UGV and any ground systems 121, 123, 125 are controlled by and/or from the ground control station 109. The isotherm levels denoted by 151 and 153 are provided for guidance related to operational concerns for implementing an aspect of the invention for optimal effects (as will be appreciated by the skilled artisan, levels between which silver iodide, as it comes into thermal equilibrium, most effectively activates ice phase for water; and threshold reflectivity for radar hail detection).

Figure 2:
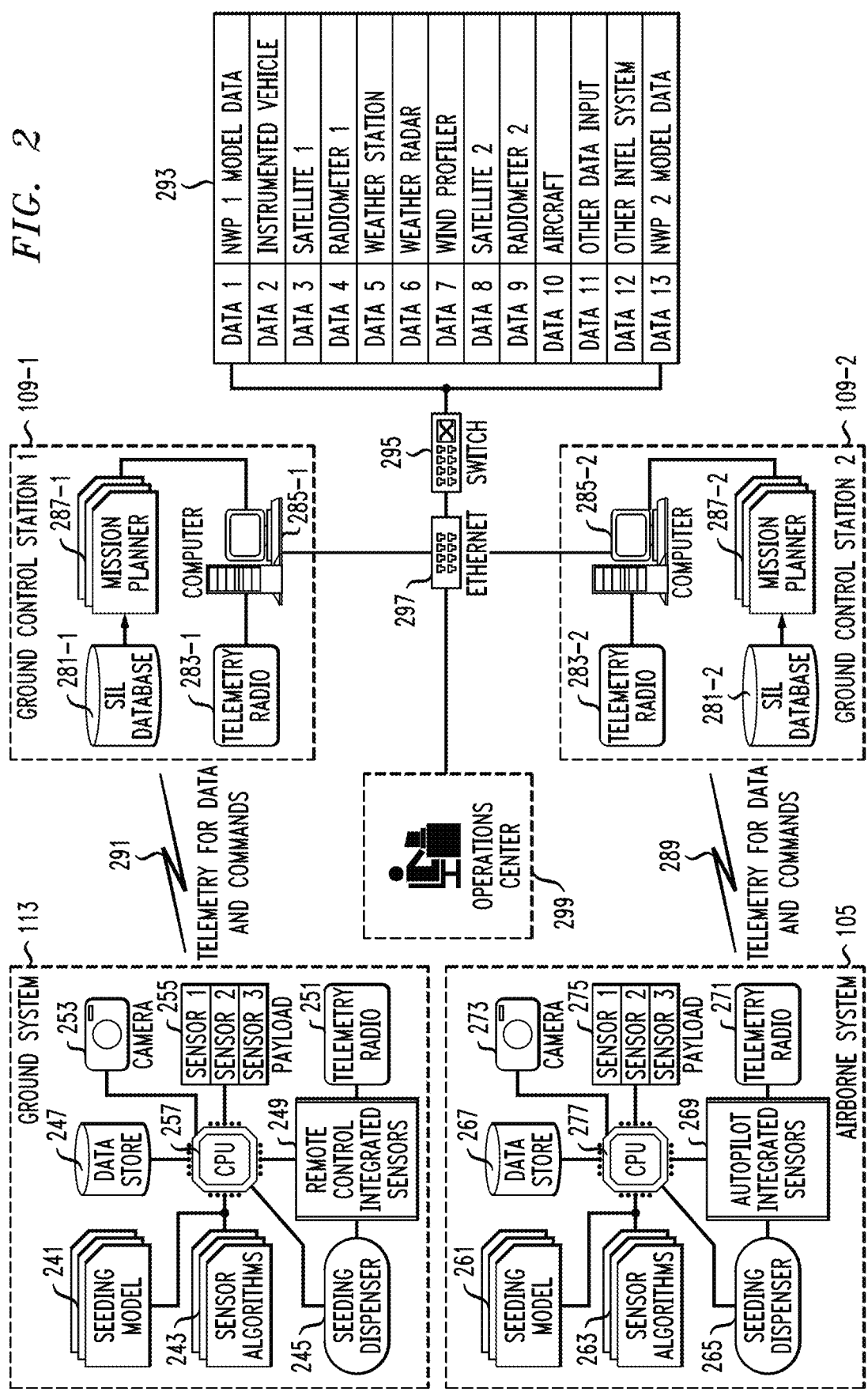
FIG. 2 depicts system-wide, subsystem and component interfaces and configurations for autonomous UAS/UGV (UGV=unmanned ground vehicle) systems with adaptive control (i.e., airborne/ground-based 'Intelligent' Systems), according to an aspect of the invention.

One or more embodiments include the regular integration of newer technological capabilities designed to enhance their mission objectives. Although the primary airborne 'Intelligent' System is fixed wing in some embodiments, in general, embodiments can employ any 'Intelligent' System with defined pertinent functional capabilities needed. One or more embodiments are not limited to a particular kind of "Intelligent' System.' "Intelligent' Systems' are autonomous systems with adaptive control, or are adaptive autonomy systems; refer again to Dydek et al. 2013. Refer also now to FIG. 2. Block 113 is generally representative of UGVs 113*a*, 113*b*, while block 105 is generally representative of UAVs 105-1, 105-2. Adaptive control refers to the improved performance and increased robustness of an autonomous system by configuring its control system to adjust the autonomous systems' seeding action as a function of measurements. Autonomous systems are herein defined as, autonomous unmanned aircraft or ground systems with adaptive control, autonomous unmanned aircraft or ground systems without adaptive control, unmanned aircraft or ground systems (UAS/UGS) with or without adaptive control, unmanned aircraft or ground vehicles (UAV/UGV) with or without adaptive control, manned aircraft or ground systems, instrumented towers (including those with a seeding system), ground-based seeding systems with or without adaptive remote controls, instrumented balloons (including with a seeding system), mobile and static observing systems equipped with seeding systems, rocket-delivered seeding material, and also any combination of these systems, not just each in isolation (e.g., UAV swarm, ground-based networked system).

Autonomous systems with adaptive control, or 'Intelligent' Systems, are, for example, guided by remote sensors (e.g., ground-based, including radar/radiometer, profilers, aircraft if available, and/or satellite) and/or 'in-situ or 'Intelligent' System platform-based sensor(s) and/or sensor system(s) to provide target locations for the seeding and typically contain a sensor suite (payload) that provides 'in-situ' atmospheric/environmental data as appropriate to identify conditions suitable for seeding or other specified application.

In one or more embodiments, the 'Intelligent' Systems contain secure interfaces with their on-board sensor payload, data management, models, 'machine-learning' as defined herein, and software controlled components. They can also interface securely with other observing systems and/or other technology for use in weather modification programs to carry out operational activities or to monitor and evaluate seeding operations (see, e.g., table of FIG. 5 for airborne and ground-based systems).

One or more embodiments are not limited to any particular design and/or any particular fabrication technique for the 'Intelligent' System itself or for any component of the 'Intelligent' System, except for expressing its required capabilities as a function of its application, adaptive autonomy, and the methodology and framework to be employed for their use in weather modification or cloud seeding program activities. That is, one or more embodiments provide a better way to perform weather modification and cloud seeding programs given the 'Intelligent' System as generally disclosed herein.

One or more embodiments utilize a fixed wing 'Intelligent' System if a requirement is for precipitation enhancement and augmentation (although this is not intended as a limitation unless recited in a particular claim). One or more embodiments utilize ground-based 'Intelligent' Systems (i.e., mobile or static autonomous UGV with adaptive control) if the requirement is for fog dispersal or involves seeding low-based stratiform cloud systems (i.e., bases at about 3,000 m and lower) (although this is not intended as a limitation unless recited in a particular claim). An airborne 'Intelligent' System could be used for low-based stratiform clouds or a fog deck thicker than 700 feet (213 meters). Similarly, ground-based 'Intelligent' systems could be used when seeding elevated stratiform clouds and/or convective clouds. However, airborne 'Intelligent' Systems could preferentially be used when seeding elevated stratiform clouds and/or convective clouds. The final choice depends on the requirements provided by the program sponsor, as will be appreciated by the skilled artisan, given the teachings herein. One or more embodiments advantageously employ adaptive autonomy, interfacial configuration of system components and corresponding software framework, enhancing prior work of DeFelice and Axisa 2016. Non-limiting exemplary benefits, features and advantages of one or more embodiments, as compared to the current weather modification program and activities, will be appreciated by the skilled artisan given the teachings herein.

In one or more embodiments, a framework for developing 'Intelligent' Systems and integrating them in weather modification activities as defined encompasses three basic developmental components, namely:

1) Sensors integrated onto autonomous airborne or ground-based platforms. The sensors measure meteorological state parameters, wind in 3D, turbulence, and aerosol-cloud microphysical properties in conditions that are conducive to seeding stratiform cloud (including fog), and/or convective clouds, or any combination thereof.

2) Algorithms that manage the collection, quality assurance (QA), distribution, analysis and use remote sensing (e.g. radar), in-situ real-time sensor data, and/or other data as required to guide the platform towards suitable targets to implement the seeding, in the case of airborne or mobile ground systems. However, in the case of stationary ground Systems, the equivalent algorithms control seeding start/stop, seeding rate, and possibly seeding material use choice.

3) Deployment of each and all 'Intelligent' systems, including in a configuration for which they will be used to carry out for a specific mission.

In one or more embodiments, once each 'Intelligent' System successfully passes through these steps it is ready for use to fulfill the mission requirements. The 'Intelligent' System platform, which should be capable of supporting the weight of the payload, data management, and/or seeding systems, should also be able to handle the turbulence in the atmospheric levels it traverses. Refer to Axisa and DeFelice 2016, which also makes the point that small UAS platforms, with or without autonomy and/or adaptive control, might be capable of carrying some seeding material in the form of ejectable or burn-in-place flares. Weather modification operations will most likely require larger UAS, since they likely need to carry sensors, AgI acetone solution and/or salt micro-powder, unless newer technologies are developed and integrated onto these systems. The latter is easily accommodated by one or more embodiments.

Referring to the table of FIG. 5, one or more embodiments set functional capabilities for appropriate and even optimal 'Intelligent' Systems used during weather modification and/or cloud seeding activities, i.e., sensor payload, on-board data processing system with remote access, corresponding software for all platform functions, control system, and communication components. In one or more embodiments, the control system includes an Intelligence, Surveillance, and Reconnaissance capability that will, depending on application, include functionality shown in the table of FIG. 5 and/or additional or alternative functionality. The video information, along with its thermodynamic measurements, aerosol-cloud microphysical properties, satellite and/or other relevant sensor-retrieved cloud droplet effective radius can be used to identify suitable seeding conditions in the identified clouds. It is noted that there is a subtle difference in the use of video between airborne, ground mobile and ground stationary Systems primarily as it relates to when and how the video information is used. The ground platforms use the video to change the status of the System to standby and begin taking measurements; whereas the mobile system also uses video to help it stay within the cloud. The airborne System uses video to determine if a given cloud is the one identified by the Mission Planner. These data, however, can also be used to ensure the validity of the control system, and/or for additional or alternative uses.

In one or more embodiments, the 'Intelligent' Systems, especially if airborne, are able to support the weight of the sensor payload, seeding system, data management, communications and software controlled components/aspects in the most severe atmospheric conditions without any component failure and operate to fulfill mission requirements for seeding. Given the teachings herein, the skilled artisan will be able to adapt, for example, a fixed-wing UAS to implement one or more embodiments.

A schematic for an exemplary embodiment of airborne and ground 'Intelligent' Systems communications and component interfaces and their subsystems is shown in FIG. 2. FIG. 2 shows an exemplary UAS control routine schematic for autonomous control of the vehicle(s) 105, 113. Data acquisition includes inputs from the onboard sensors 255, 275. Data is also obtained in one or more embodiments from the radar 101, 111 covering the target area 115; see generally 293; as well as from the cameras 253, 273. Data processing steps are carried out by CPUs 257, 277 to ensure that good quality data is passed to the algorithms 243, 263 and models 241, 261, where high-level control is performed (i.e., of seeding dispensers 245, 265 and of vehicles 113, 105 by remote control 249 and autopilot 269, respectively). Data 293 can also be communicated through ground stations 109-1 and 109-2 (collectively, 109) by telemetry 289, 291, 251, 271, 283-1, 283-2. The mission planner 287-1, 287-2 includes an algorithm that produces the coordinates where seeding conditions are predicted to occur, and passes those locations to the UAS autopilot 269/UGV remote control 249, as the case may be. Once the UAS is near these coordinates, the sensor algorithms 263, 243 and coalescence model (executing on CPUs 277, 257 and/or computers 285-1, 285-2) become active, and through a hierarchy of logic statements, determine the exact location to start seeding. One or more embodiments employ a simulator implementing software in the loop (SIL) technology 281-2, /281-1 to simulate the UAS flight characteristics, UAS payload sensor data 275, 255, 263, 243, data 293 and mission planner output 287-1, 287-2. These outputs are used to optimize the seed/no seed thresholds and targeting algorithm, saving the high cost of trial and error approaches and ensuring success, and should provide a smaller number of false positive seeding condition detections (compared to current practices).

The sensor payload data 255, 275, seeding algorithm data 241, 261 and autopilot data 269 (or Remote Control 249 if ground-based) are transmitted to a ground control station (GCS) 109 and thence to an operations center 299 via telemetry 289, 291 and Ethernet 297, with priority given to autopilot 269/Remote control 249 data when bandwidth is limited. With this setup, any mobile 'Intelligent System, including UAS1 105-1/UAS2 105-2 for airborne applications, only requires coordinates uploaded via telemetry to navigate to the preferred location for initial targeting. All other navigation control can be done onboard the vehicle (with pilot over-ride active at all times, for example). The ground 'Intelligent' System is capable of machine learning as described herein. The GCS computer 285-1, 285-2 utilizes pre-defined flight plans from mission control software 287-1, 287-2 to generate initial navigation coordinates for UAS1 105-1 and UAS2 105-2 and/or UGVs 113. Other embodiments could architect the location of navigation control in an alternative manner.

The airborne 'Intelligent' System is guided, in one or more embodiments, by using the 'real-time' in situ-based measurements and flight guidance from the GCS Mission planner 287-1, 287-2 and SIL database 281-1, 281-2 to navigate the 'Intelligent' System autonomously to areas of suitable temperature, relative humidity, updraft velocity, aerosol size distribution and droplet size distribution to implement optimal seeding. Optimal seeding means that seeding starts and proceeds at a rate that will yield maximum conversion of cloud water to precipitation that falls in the intended location on the ground, or target area. Software-in-the-loop (SIL) technology, for example, is used in one or more embodiments to integrate the data from past missions of a similar kind and to evaluate them to formulate a mission plan. The mission planner 287-2, 287-1 'interrogates' the SIL 281-1, 281-2 to find the best matching mission that has been validated. The result of the interrogation is a set of simulated flight characteristics, payload sensor data, numerical weather prediction NWP model data (NWP1 and NWP2 model data in data set 293) and seeding model output 261, 241 to carry out the mission using the data ingested up to that time. The simulator routine (within 287-2, 287-1; 281-2, 281-1; and 285-2, 285-1) is then applied to optimize the seed/no seed thresholds and targeting routines. Once the simulations are complete, field campaigns involving the System 105 or 113 are conducted. The simulations are continuously updated. The latter embodies machine learning as described herein. This is preferred over the high cost of trial and error approaches and ensures success. It has an extended usefulness in conjunction with Ground Systems 113. The same software-in-the-loop (SIL) technology, for example, is used in one or more embodiments to integrate the data from past missions of a similar kind and to evaluate them to formulate a mission plan for future operations. The latter embodies to machine learning as described herein.

In the case of ground-based 'Intelligent' Systems, in one or more embodiments, the control system (remote control and routine 249, SIL database 281-1, Mission Planner-287-1, telemetry or radio 283-1, computer 285-1) differs slightly from the airborne 'Intelligent' System (105) equivalent (respectively, 269, 281-2, 287-2, 283-2, 285-2). In some embodiments, the control system is executed by NWP (see data set 293) and/or seeding model guidance 241, 261, based on data or information from other techniques, the data from the mobile intelligent ground systems 113, and stationary ground systems 121, 123, 125 and other data set parameters 293, and the data from the 105). Hence, in one or more embodiments, a model turns the ground system on, not a human. There is still the ability for human over-ride in one or more embodiments via the operations center 299. The deployed ground systems, upon deployment, are in standby with the ability to communicate with the operations center 299 (see FIG. 2) and the video camera 253 is activated. Once cloud is detected their full sensor system 255 is activated, but they are not necessarily commanded to seed at that time. The ground-based 'Intelligent' System's video information 253, thermodynamic, aerosol-cloud microphysical properties, satellite and/or other relevant sensor-retrieved cloud hydrometeor parameter is processed by CPU 257 and as needed computer 285-1 to identify suitable seeding conditions in the identified cloud, to control the start and stop seeding actions, as well as to control the type of material dispensed (if specified in the program requirements), and to keep track of the total amount dispensed by dispenser 245 under control of CPU 257 and/or remote control 249 via telemetry 251, 291. If the ground-based System is mobile, its elevation is also added to the aforementioned. Unlike in the airborne 'Intelligent' System and in part the mobile ground-based 'Intelligent' System, at least some embodiments of the static ground based "Intelligent' System' do not use the sensor payload information to move the system to the ideal location; instead they use that information to identify when the seeding system needs to be on standby, turned on/off, to set the seeding rate, and, if not predetermined, to determine which seeding material needs to be dispensed. Further, in one or more embodiments, non-seeding 'Intelligent' Systems in an array of ground-based 'Intelligent' Systems can collect data throughout the same period, concurrently, with the systems that were seeding. Note that telemetry is a non-limiting example of a communication technique; one or more embodiments can generally employ wireless and/or wired communications systems to transmit data and/or commands, it being understood that wired systems would generally be employed for ground-based assets that are stationary or have at most a limited range of motion.

Simultaneously with the aforementioned, and in at least some instances, primarily on ground control station computers 285-1, 285-2, each ground-based 'Intelligent' System's sensor data (e.g., air temperature, wind field, aerosol-cloud microphysical data, seeding data including altitude and terrain elevation, 255 and 293) combined with mesoscale and regional scale NWP models 293 arc used to perform an ensemble of simulations and results assimilated in the SIL 281-1, 287-1, 285-1. These are analyzed for ensuring maximum seeding effectiveness, i.e., which generators produce best results in specific meteorological situations. When the sensor measurements from the 'Intelligent' System' and/or NWP model data match the assimilated 'best results' or threshold cases assimilated in the SIL database (281-1), a signal is telemetered back to 113 via 291 that arrives at the Remote Control 249 instructing 249 to send the signal to 245 of each 'Intelligent' System 113 that tells the seeding system 245 to start seeding and stop seeding. This is repeated for all ground 'Intelligent' Systems 113 involved in a project. The SIL database 281-1 builds a climatology over time making the system more intelligent. If the decision is to have a mobile ground-based 'Intelligent' System seed, and wind direction is from the required wind direction range, the optimal end location of the mobile ground-based 'Intelligent' System 113 is determined, passed back to the Remote control 249 and this ground 'Intelligent' System 113 autonomously starts moving and subsequently adapts its path accordingly as it moves toward that 'end' point while seeding and making measurements. If at any time during the mobile System's path its altitude falls below the altitude at and below which seeding material will not make it to the target area (based on the ensemble of nowcasts), then seeding stops. The system 113 is redirected to an appropriate higher location to maintain optimal targeting of its seeding material, and seeding is restarted. As noted a priori the latter are continuously updated throughout the operations. The 'Intelligent' Seeding starts and ends once the sensors indicate favorable and then unfavorable seeding conditions, respectively. Once seeding from the mobile ground 'Intelligent' System 113 stops or there is an unsafe situation, the System stops moving but continues making measurements, at which time a replacement system is in place to continue the activity accordingly. The ground control station (GCS) Mission Planner 287-1 can also have pre-defined 'drive' routes plans from mission control software and the position data to generate initial navigation coordinates for each ground based 'Intelligent' System required to be mobile. An ensemble of nowcasts can also be configured, run, and analyzed in near-real-time using the data obtained from one or more embodiments (and not simply climatology), even while operations are ongoing and not just after the fact, to determine where each ground-based non-mobile 'Intelligent' System should be located in specific meteorological situations to yield optimal results in a target area. The corresponding activity in current weather modification programs is based on climatology (i.e., the spatially and temporally averaged meteorology for the same region) and usually separate from the operational weather modification program/activities. In one or more embodiments, all 'Intelligent' Systems can also communicate alerts for reloading the seeding materials, and about extreme weather conditions to the operations center 299, other 'Intelligent' Systems 105, 113 and aircraft data set 293.

The ability to have the precipitation fall in an intended area on the ground is known as targeting. Targeting is a complicated aspect of any seeding operation/activity and is accommodated by the software, in one or more embodiments. Systems of one or more embodiments are guided by satellite or weather radar which sends data to the mission planner and SIL database components that then processes and passes updated coordinates in near real-time to the System's autopilot to navigate to regions of suitable convection for cloud seeding. One or more embodiments have the ability to use in situ, near-real-time cloud system relevant data to support targeting, which is an enhancement over conventional cloud seeding capabilities via ground or airborne platforms.

Referring to the table of FIG. 5, the mobile or stationary 'Intelligent' System payload, including sensors designed to provide 'real-time' in situ-based measurements, passes temperature, relative humidity, and updraft velocity, for example, through the sensor algorithms 243, 263 on its CPU 257, 277 to the Mission Planner 287-1, 287-2 and SIL databases 281-1, 281-2. The SIL technology simulates the 'Intelligent' System flight characteristics, payload sensor and radar data and seeding model output. This simulator is then applied to optimize the seed/no seed thresholds and targeting algorithm. Once the simulations are complete, seeding tests involving the System are conducted. The simulator implementing SIL simulates the System flight characteristics, with navigation driven by sensor and radar data collected from the previous tests. The SIL simulator performance of the combined sensor and radar targeting algorithm can be evaluated, for example, by running an ensemble of simulation scenarios. The simulations can be compared to relevant locations from actual flight paths flown on previous cloud seeding missions to understand differences in behavior between manned operations and those performed by the UAS. In one or more instances, the data from the previous missions are previously uploaded to and stored in the SIL database 281-1, 281-2. This comparative analysis serves as guidance for improving the algorithm and simulation software as it is passed to the mission planner 287-1, 287-2. The mission planner uses this data to update the flight paths and telemeter updated coordinates back to the autopilot of the 'Intelligent' System, ensuring optimal autonomous navigation to areas of suitable temperature, relative humidity, and updraft velocity. Existing datasets (e.g. see Axisa and DeFelice 2016) provide valuable sources of data to develop and constrain the algorithms that guide the "'Intelligent' Systems." These data can be mined, analyzed and features extracted to locate representative time-series of key sensors from research aircraft flying at or below cloud base (e.g., sensors that measure updraft velocity, aerosol size distribution and droplet size distribution). One example for determining thresholds is the analysis of measured aerosol size distributions, hydrometeor size distributions and their relationship to the production of rain. A broad drop size distribution with a tail of large drops might not be suitable for hygroscopic seeding, especially if large hygroscopic aerosol particles are present below cloud base. In general terms, and when seeding is warranted, droplets have a narrow drop size distribution and are smaller near the base of the cloud. These types of clouds can be regarded as having continental properties, with a relatively large number of small droplets that may inhibit the formation of rain. On the other hand, less numerous, larger droplets in the cloud favor the natural formation of warm rain. The 'in situ' measured aerosol size distribution and hydrometeor size distribution data are similarly passed through the Sensor Algorithms 243, 263 to provide further guidance for optimizing the seeding implementation and targeting of the seeding material 241, 261, 249, 269, 245, 265. Hence, one or more embodiments employ and develop techniques to distinguish between these cloud properties and apply the seeding material based on analysis and data assimilation derived with in situ measurements and not observations that are far removed and under-representative of the particular cloud system being seeded, as might be done in research weather modification activities or program evaluations.

Similar analysis can also be conducted on radar data in cloud regions known to be suitable for seeding, to establish representative radar signatures for the corresponding periods and locations. The data can be quality assured and processed so that their output will be similar to that produced by the System sensor payload. These data would then be analyzed to develop and constrain the algorithms that guide the System, to finalize and test sensor payload algorithms; to perform the data analyses; and to develop the radar algorithm.

Operational weather modification programs typically use 5 cm weather radar that often have Doppler capability for monitoring precipitation development and storm motion (e.g., with Doppler velocity field) during operations. Refer to Keyes et al 2016 and ANSI/ASCE/EWRI 2017. An 'Intelligent System' 113, 105 equipped with radar software within its mission planner 287-2 (and/or 287-1 in some embodiments) targets convective clouds (or cells) that may be viable seeding targets. The seedable cloud targeting algorithm finds the most suitable cloud for seeding based on actual sub-cloud scale in situ microphysical data as well as the conventional radar data. It also assimilates polarimetric Doppler weather radar data fields in dataset 293, which significantly improve current targeting guidance.

In one or more embodiments, the "'Intelligent' System" also contains a seeding system to carry out cloud seeding. The seeding system 245, 265 is able to dispense hygroscopic flares and/or glaciogenic flares; solutions or powders of micro-particles or nanoparticles or other depending on the requirements. The seeding strategies using one or more embodiments can, but need not necessarily, change as compared to those currently used. For instance, cloud targets are identified differently in one or more embodiments versus conventional seeding operations. Conventionally, seeding targets (clouds) are chosen visually by the meteorologist on the ground and/or the pilot in the aircraft (e.g., Keyes et al 2016; ANSI/ASCE/EWRI 2017; ANSI/ASCE/EWRI 2013; and ANSI/ASCE/EWRI 2015). In one or more embodiments, the meteorologist on the ground may not have a visual, and the pilot/operator of an airborne/ground unmanned system will often times be beyond the line of sight. Observers beyond the line of sight may be present and unqualified to identify suitable clouds notwithstanding current regulation (furthermore in this regard, FAA rules do not currently allow UAS to operate in cloud or beyond line of sight; they do allow centers of excellence to extend the line of sight beyond the origin point—there have been exceptions). Hence, the visual in one or more embodiments is made using onboard video processing of cloud targets. That information can be fed into the autonomy module along with other data inputs as noted a priori, and the path of the "'Intelligent' System" modified in near real-time accordingly. The 'Intelligent' System pilot/operator will typically have an option to override the autonomy from his/her control point through the operations center 299. In contrast, a pilot of a manned aircraft carrying an adaptive technology, (i.e., for example, CWIP, see Axisa and DeFelice 2016), paired with a seeding system (e.g., 113 and/or 105), might be effectively used within one or more embodiments, all other considerations of manned aircraft notwithstanding.

Other examples include the use of icing rate sensor information with ground seeding dispensers or generators, and ground sensors combined with models and satellite retrieved microphysical properties at cloud top (e.g., Keyes et al. 2016, ANSI/ASCE/EWRI 2017). In such conventional cases, especially in hard to reach orographic areas, the icing rate sensor information can be sent to the person responsible for turning on/off the seeding system. That person then calls the generator and presses a button to turn it on or off; otherwise does so manually. One or more embodiments employ (as compared to prior art) more relevant and more accurate data from a more relevant location to automatically initiate the seeding. In another example, namely, ground sensors, the same are combined with NWP models and satellite retrieved information, and manually used with best available nearby meteorological/climatological data to determine the best locations for the seeding generators and under what conditions that material will yield precipitation that reaches the target area, and conceivably when to turn the generators on/off. Ground-based icing sensor and satellite data and satellite-retrieved information are typically not representative of the part in the cloud that is relevant or relatable to where the information is needed to determine when seeding should start/stop or evaluate seeding actions. These are still manual efforts primarily and are currently used post operations or as a piggyback to a rare research activity. One or more embodiments, in contrast, automatically measure or obtain such information more accurately and from a more relevant location and use same to automatically initiate the seeding.

Pertinent aspects regarding how to equip the UAS platform with a seeding dispenser (or delivery) system will now be discussed. The skilled artisan will appreciate that the seeding dispenser system for 'Intelligent' Systems used in one or more embodiments will be more robust than simply mounting a AgI flare on a UAS platform and igniting that flare in flight, since using any UAS in an operational weather modification program activity is many orders of magnitude more difficult. Conventional technologies used operationally today on manned seeder aircraft are not yet directly transferable to any UAS. One example is the longevity of flight through supercooled cloud by the UAS platform. There are commercially available products that might be used on a UAS platform. However, until such are tested for the particular system, which is an integral part of one or more embodiments, the autonomy would have to reposition the UAS to a warmer, dryer location. After losing the ice build-up, the vehicle then may be repositioned to seed the cloud top or at the cloudbase, for example, depending on the specific meteorological situation. These issues are accommodated as standard practice through one or more embodiments.

Cloud top seeding commonly uses droppable flares, which require approximately 600 to 1800 m, depending on burn time after ignition, before being completely consumed (Keyes et al. 2016). The 'Intelligent System' of one or more embodiments is able to accommodate such a distance and maintain minimum altitude restrictions as required by regulatory agencies, as well as ensuring that the seeding material reaches the $-5°$ C. vertical cloud level for AgI flares to become active ice nuclei. Conventional seeding aircraft can use AgI flares, among other seeding materials. Successful cloud treatment for precipitation augmentation typically requires in-cloud seeding rates of tens to hundreds of grams of AgI per kilometer, and hundreds to thousands of grams per hour when seeding the tops of large convective cloud systems (Keyes et al., 2016). In contrast, the use of AgI solutions from ground-based generators typically yields about 5 to 35 g of AgI per hour of operation (Keyes et al. 2016).

It is worth noting that the $-5$ C isotherm level inside a convective cloud is used to determine the likelihood of ice (hail) depending on the RADAR reflectivity values for that general area. With the $-5$ C level and the RADAR reflectivity value exceeding a threshold value (depends on wavelength of the radar) at that $-5$ C level, then there is likely to be hail inside that system and the seeding strategy would have to change or stop depending on specific meteorological and cloud situation.

If an airborne UAS is required to use a seeding dispenser capable of carrying 100 flares, each containing 10 g of AgI (by weight), this would add at least 4.3 kg of total extra weight from the flares alone (flares have significant weight other than the payload; i.e., a flare has 43 g total weight of which 10 g is AgI). This does not take into account the added weight of the entire seeding dispenser system (i.e., flare rack) though. The amount of AgI dispensed might yield a sufficient amount of AgI to be successful at enhancing the precipitation efficiency of that cloud system during its flight time. However, depending on the size of the program and its requirements, one might need multiple Systems to ensure continuous seeding. An alternative would be to integrate a new technologically advanced seeding dispenser onto the System, which may or may not require a new kind of seeding material or a modification to enable the use of currently used seeding materials. Assuming the operational considerations of the system and the lightweight seeding material delivery were accommodated, how the seeding material is delivered and whether 'Intelligent' System platform would only carry it would reach the appropriate part of the cloud is part of this aspect. This example used AgI, but similar concerns are applicable when the requirements call for seeding material to be a powder of nanoparticles/microparticles, or a glaciogenic- or salt-containing solution.

In one or more embodiments, the data management system for the 'Intelligent' System used in this methodology has the computational throughput and capacity to handle the data volumes generated for at least an entire program mission and activity. It encompasses the on-board data processing system (CPU and data storage) with remote access, the configured interfaces with the control system (remote control or autopilot, SIL database, Mission Planner, radio, CPU), seeding system (seeding model 241, 261 and seeding dispenser 245, 265, and corresponding software), communications (Telemetry is a non-limiting example of suitable wireless communications) 283-1, 283-2, 291, 289, 251, 271, sensor payload (including sensor algorithms) 255, 275, 243, 263 and the auxiliary/ancillary (or other data including other 'Intelligent Systems') connections (i.e. data set 293), as well as corresponding models (in data set 293; as well as 287-1, 287-2, 241, 261), 'machine learning' as defined herein, and software for all platform functions. It seamlessly ingests, in near real-time, the sensor payload data (e.g., temperature, relative humidity, 3D wind field, pressure, aerosol size distribution and droplet size distribution, liquid water content/ice water content' other as required), auxiliary/ancillary data (e.g., cloud locations, topography, seeding locations based on convection or other defined criteria, information from other 'Intelligent' Systems, satellites, radar, data archives), seeding action data and autopilot data (e.g. in data stores 247, 267 as well as 283), (and optionally other appropriate data) in accordance with ground control stations 109 and data set 293. It then performs a simple quality assurance (QA) on these data. Furthermore, if the communication interfaces between each sensor of the seeding payload, and each component of the seeding system, data processing functional component, software functional component including autonomous path planning, are not optimized for a specific System and for a specific mission goal or function, then its measurements may be unusable scientifically and their use may misdirect the flight path, resulting in unfavorable results. We have found that the use of standard trade studies, as opposed to trial and error as is contemporary, is preferable to address the issues related to seeding material, seeding delivery, targeting, sensor placement and non-optimal interfaces with the platform/sensors. An engineering trade study that investigates sensor performance, on an individual basis and ultimately as a combined unit, as a function of platform integration and placement, is appropriate in some instances, for example.

In a non-limiting example, the data stores 247, 267 send their data to GCS computers and SIL database for use as described herein; i.e., machine learning, but also backup or archive (retaining latest cloud condition and location information, seeding material parameters, for example). The data stores 247, 267 retain the information necessary primarily as a systematic failsafe such as in the case of loss of ground communication and/or sensor data for instance, and to streamline operational seeding. The data stores 247, 267 may thus have limited storage with primary storage on the ground (e.g. SIL database(s)). In a non-limiting example, upon the loss of sensor data, use data stored in 247,267 and engage 269,249 to send a signal via 271, 251 to 293 and 281-1, 281-2 or other source to retrieve relevant 'other' data to fulfill the missing information gap and continue with seeding mission program.

The seeding action, where and when to seed are determined by the seeding system software (i.e., seeding model 241, 261 and seeding dispenser 245, 265, and corresponding software) that extracts ancillary/auxiliary (e.g. data set 293) and platform sensor data inputs 255, 275, with a capability to have pilot override 299. Determining when to seed primarily uses the platform sensor data 255, 275) once 'where' to seed is determined by autopilot/remote control routines. What seeding material to dispense, if not predetermined, is, in one or more embodiments, determined by platform sensor data, primarily, and as needed auxiliary/ancillary or 'other' data. For example, using examples elsewhere herein as a basis, the seeding model algorithm ingests and extracts the time-stamped sensor data entries, and then processes these data to extract those data that fall within threshold values of operational quantities to determine when to seed, and what material to dispense if not predefined. The threshold values of operational quantities come from the on-board sensor payload, which includes environmental (e.g., 3D winds, temperature, relative humidity, pressure), aerosol and cloud microphysical properties (e.g., aerosol concentration, aerosol chemistry, aerosol hygroscopicity, drop concentration, drop size distribution, effective drop size, hydrometeor size, hydrometeor type, ice-cloud depolarization ratio). The data are quality controlled using a simple test (e.g., data range test), and processed in real time (e.g., passed through low pass filter) to provide data that describe the measured atmospheric/environmental parameter of interest (e.g., updraft velocity, droplet size and corresponding droplet concentration, and aerosol size and corresponding concentrations). These data are then passed through a series of if/then statements which essentially encompass the threshold criteria to indicate seedability. If the thresholds are met, then seeding occurs in accordance with the environmental conditions and the chosen material to be dispensed. For example, if hygroscopic seeding material is used, then it would likely be dispensed at cloud base or at ground level; whereas glaciogenic material might be dispensed at cloud base, cloud top or at ground level, while it and other systems continue to make sensor measurements, collect ancillary/auxiliary data and manage their programmatic roles. The thresholds are also used to establish natural variability, address scientific research and analyses, and in some circumstances, are relatable to control cases if seeding occurred in a nearby cloud.

In one or more embodiments, each airborne 'Intelligent' System autonomously navigates toward candidate cloud area where seeding is probably effective, based on the location coordinates provided through the autopilot, which gained its coordinates via the Mission Planner 287-1, 287-2. The location coordinates can be obtained, for example, from the auxiliary/ancillary data inputs and processed, such as by a navigation control-like module (autopilot/remote control 249, 269, mission planner 287-1, 287-2 and SIL database 281-1, 281-2), onboard the system (in one or more exemplary non-limiting embodiments, pilot over-ride is available via operations center 299 at all times (i.e., 24 hours per day, 7 days per week during operational periods)). The navigation or autopilot, or remote control (if ground-based) system, includes remote control or autopilot routine 249, 269, SIL database 281-1, 281-2, Mission Planner 287-1, 287-2, radio 283-1, 283-2 (communicating with radios 251, 271 via telemetry 291, 289), CPU 285-1, 285-2. Again, telemetry is a non-limiting example of communication. The autopilot or remote control routine, SIL database and Mission planner, or an autonomous controller, or equivalent, nowcasts the real-time ingested ancillary/auxiliary location coordinates and platform sensor data. The output of the autonomy routine, or equivalent, is then fed back into the navigation (autopilot or remote control, 249, 269) that allows this system to automatically adapt its path accordingly with ongoing in situ sampling and NWP model guidance as it heads to the new locations. The latter is continuously updated throughout the flight. Once the 'Intelligent' System reaches the ideal location, the adaptive navigation routine passes control and sensor data to the seeding system (i.e., seeding dispenser 245, 265 including seeding model 241, 261 and corresponding software), and seeding begins. Seeding starts and ends once the sensors indicate favorable and then unfavorable seeding conditions, respectively. The seeding cycle continues until the UAS must return for fueling or there is an unsafe situation, at which time a replacement system is in place to continue the activity, as appropriate. The ground control station (GCS) computer 285-2, 285-1 has pre-defined flight plans from mission control 299 software and the position data to generate initial navigation coordinates for each 'Intelligent' System.

Similarly, based upon examples elsewhere herein for ground-based (stationary, mobile, and/or tethered) 'Intelligent' System, data from its sensor payload or model simulated data to identify when systems are seedable, select the seeding material (if not predetermined), decide when to turn on all (if an array), one or none of the systems, and continue the seeding operation until suitable conditions have ended. The seeding material selection is then based on meteorology and aerosol-cloud microphysics and meteorological data. The Seeding System software tracks the use of the material and provides alerts for reloading the seeding materials. Each system also communicates extreme weather conditions. Once seeding ends, each system continues to make measurements as required. Further, non-seeding 'Intelligent' Systems in an array of ground-based 'Intelligent' Systems can be collecting data throughout the same period, concurrently with the systems that were seeding.

There are times when mobile (aircraft included) and static 'Intelligent' systems will be appropriate. An example of such could be in an orographic region where snowpack augmentation or precipitation increase is required. For sake of this illustration, seeding will happen using a glaciogenic material using an array of static ground 'Intelligent' Systems and a single mobile 'Intelligent' System. The mobile ground-based 'Intelligent' System is located at the furthest upwind distance from the target area but in a wind direction (relative to the target area wind rose) that is not climatologically frequent. The latter wind sector usually yields treatable clouds but the other Systems in the array, and a stationary 'Intelligent' system would not be effective in seeding these clouds until it was too late (meaning if they did have an effect the precipitation would not likely fall in the target area). Furthermore, an airborne 'Intelligent' system is not feasible. Given these requirements, in the conventional cloud seeding scenario, the ground seeding generators would either not be turned on, or they would all be turned on. Either situation would yield minimum benefit at a typical cost using the conventional scenarios currently used today.

In contrast, one or more embodiments are more cost effective and enhance or even maximize the effectiveness of the seeding action, using in situ data from each 'Intelligent' System and other data to have one or all stationary ground 'Intelligent' Systems seed the cloud system. Further, when the wind direction was from the special wind sector, one or more embodiments may, for example, primarily have the mobile ground generator seed the cloud system. The latter requires that the mobile ground system, if it does start seeding, would stay with that cloud during the seeding until otherwise directed. As discussed elsewhere herein, the information from the past studies can be stored in the SIL database 281-1, 281-2 along with the seeding thresholds. The database 281-1, 281-2 can also contain detailed topography, road information, land cover type and morphology data for the target area and surrounding region. When these data determine that a ground 'Intelligent' System will not yield precipitation in its target area, the system will stop or not be seeding, and will be making measurements, for example. Likewise, the mobile System seeds as it is moving when the wind direction is from the special wind sector, and the optimal end location of the mobile ground-based 'Intelligent' System is not reached. It continuously adapts its path and checks whether to keep seeding as it moves toward the end location while recording data. If at any time during the mobile System's path the nowcasts indicate that it will be at an elevation at and below which seeding material will not make it to the target area, then seeding stops; the system stops moving; but its sensors continue to make measurements. It shortly thereafter is autonomously directed to an appropriate location to maintain optimal targeting of the seeding material until the seeding event stops. More details are provided elsewhere herein.

The "Intelligent" System that detects clouds amenable to seeding and the location of the seeding will, in one or more embodiments, involve the development of targeting, radar, and sensor algorithms in a manner similar to that highlighted elsewhere herein for developing seed thresholds from the sensors. This can be done, for example, by: (1) analyzing data from previous field campaigns to define key sensor parameters that input data into the cloud targeting algorithm, and (2) testing the performance of these algorithms through software-in-the-loop (SIL)-based simulator. Radar data are commonly used in conventional cloud seeding programs and one or more embodiments can use radar data as well to guide the navigation. In the case of 'Intelligent' Systems the radar data algorithm can contain features augmented by 'in situ,' 'Intelligent' System sensor data and simple rule-based multi-threshold seed/no seed algorithm. In order to make this algorithm robust, a cloud seeding model 261 (one non-limiting example is a coalescence box model or the like) can be added that will run on the UAS data system CPU (note corresponding UGV cloud seeding model 241). The box model ingests the measured drop size distribution and calculates the time evolution of the drop sizes and concentration into the near future. The result gives a very strong indication on whether the cloud is capable of producing drizzle naturally (i.e. without seeding) and hence whether it should be targeted for seeding. This enhanced radar data algorithm, or equivalent, produces the coordinates where seeding conditions are predicted to occur, and passes those locations to the Systems' autopilot. Once the System is near these coordinates, the sensor algorithms and coalescence model become active, and through a hierarchy of logic statements, determine the exact location to start seeding.

The enhanced radar data routine can be further enhanced by programing it to use polarimetric Doppler weather radar data. This is a significant advancement beyond conventional Doppler weather radar guidance, if these data are available, because of the additional information provided by the Polarimetric feature. This further enhancement uses a simple cloud droplet growth box model to calculate the evolution of the drop size distribution (DSD) starting with data ingested from a spectrometer that measures the existing drop size distribution. The model performs a threshold comparison used to support the seeding decision result. If starting with the basic radar data acquisition algorithm and it is desired to use dual polarization data, improvement to handle dual-polarization data will be appropriate. That provides the ability to identify ZDR (Differential Reflectivity) columns and regions of high specific differential phase between the dual polarization signals, both indicators of significant precipitation. In addition, a hydrometeor identification routine can be incorporated and improved, so that different microphysical regimes can be identified within a storm.

A quantitative precipitation estimation program should be available for the estimation of precipitation rate at the ground, and can be used to verify the algorithm. The corresponding measured droplet size distribution (DSD) is ingested into the Seeding model which calculates an ensemble of size distributions up to several minutes in the future. These distributions are compared against the metric seeding signature to determine if seeding should begin, and/or stop. The distinguishing features of a seeding effect is a DSD featuring an enhanced concentration in the ~15 µm to ~22 µm diameter range due to the "competition effect" as described in Cooper, W. A. et al., "Calculations pertaining to hygroscopic seeding with flares," J. Appl. Meteor., 36, 1449-1469 (1997)(hereinafter, "Cooper et al. 1997), the complete disclosure of which is hereby expressly incorporated by reference herein in its entirety for all purposes, although the skilled artisan will be generally familiar with same. and a "tail effect" of enhanced concentration of large droplets (~22 µm to ~30 µm diameter range) as described in Rosenfeld, D. et al., "A quest for effective hygroscopic cloud seeding," Journal of Applied Meteorology and Climatology 49(7) pp. 1548-1562(2010)(hereinafter, "Rosenfeld et al. 2010"), the complete disclosure of which is also hereby expressly incorporated by reference herein in its entirety for all purposes, although the skilled artisan will be generally familiar with same. If the comparison matches the seeded metric DSD, an affirmative to begin seeding is passed by the algorithm to the seeding routine.

Alternatively, if the number of drizzle drops that are produced by the modeled DSD exceed a certain threshold size and concentration a few minutes into the simulation, that may indicate an active warm rain process and hence no seeding output is passed by the algorithm to the seeding routine. For example, if large drops >30 µm are produced in the box model indicating active warm rain process is established; no seeding is recommended. One could estimate the rate of seeding required to modify the measured DSD for a seeding effect and a tail effect. This would benefit operations since it provides guidance for optimal seeding based on actual in situ data and not arbitrary or derived multivariable values. A sensor payload that could provide the aforementioned data is summarized in the table of FIG. 6; the same could include, for example, an instrument that measures 3D wind velocity such as from the multi-angle inertial probe (MIP), which is simply the wind sensing part of the aforementioned Rain Dynamics CWIP, one that measures drop size distributions such as the aforementioned Droplet Measurement Technologies back-scatter cloud probe with polarization detection (the instrument includes the ability to polarize the signal prior to detection and allows the software to determine phase of the hydrometeor, and for other shape related calculations) (see also Beswick et al. 2014), and one that measures aerosol size distribution such as the Handix Scientific Portable Optical Particle Counter (POPS) available from Handix Scientific LLC, Boulder, CO, USA. Regarding the latter, see also Gao, R. S. et al., "A lightweight, high-sensitivity particle spectrometer for PM2.5 aerosol measurements," Aerosol Science and Technology, 50:1, 88-99 (2016) (hereinafter "Gao et al 2016"), hereby expressly incorporated by reference herein in its entirety for all purposes, although the skilled artisan will be generally familiar with same. Given the teachings herein, the skilled artisan will be able to implement one or more embodiments utilizing these sensors or the like.

Once each instrument is found to perform within specifications, it can be integrated onto the airborne or ground system. Inter comparison data obtained from a separate system will enhance the performance comparison. It will allow for testing of multiple instruments on different platforms and to constrain instrument errors.

The complexity of creating adaptive autonomy through a hierarchy of algorithms may produce limited functionality and reliability unless it is well designed, simulated and verified. The simulation includes running archived cases in the radar routine with a set of assimilated aircraft observable parameters, then performing the simulation to see if the 'Intelligent' System finds the target cloud. Once the target cloud is reached in the simulation, the aircraft then switches to in-situ sensing and finds the area of maximum threshold condition, starting seeding at the latter location, then finding the position of the minimum threshold condition where seeding stops. The process repeats for varying dynamic and microphysical conditions until the radar routine updates with new target coordinates. The underlying hypothesis is that the radar routine can be modified to not only nowcast the location of convection with real-time radar echo data input about the cloud environment, but also with sensor data input from the System. The combination of radar and sensor data improves the ability to forecast optimal seeding conditions.

In a manner presented in detail elsewhere herein, the nowcast outputs can be simultaneously telemetered to and ingested into the simulator on GCS computers to simulate the performance of the combined sensor and radar targeting algorithm by running an ensemble of simulation scenarios. The simulations can be compared to relevant locations from actual flight paths flown on previous cloud seeding missions to understand differences in behaviors between manned operations and that performed by the UAS. This analysis can serve as guidance for improving the algorithm and simulation software.

In one or more embodiments, each 'Intelligent' System transmits all data (i.e., sensors, seeding system, auxiliary/ancillary and autopilot or remote control) to the ground control station (GCS) via telemetry for archive and computationally intensive processing. The results from computationally intensive processing can be sent back to the 'Intelligent' System data management system. Further, in one or more embodiments, the reliable transmission of data among and between the 'Intelligent' Systems and the operations center is ensured. One or more embodiments include power back-ups in the event of power failure, as well as standard graceful degradation schemes in the event of sensor or data failures, incomplete data records, or bad data.

Once the 'Intelligent' System and its component development have progressed beyond passing their tests and their development cycles have provided results that have met the programmatic requirements, the 'Intelligent' system is ready for deployment. In one or more embodiments, readiness for deployment includes making sure not only that the sensors are providing acceptable data relative to primary standards or no worse than field standards, but also that the autonomous UAS system with adaptive control ('Intelligent' System) algorithms are performing within required specifications. The following scenario is employed for illustrative purposes during an exemplary preparation for deployment process, wherein one or more embodiments advantageously allow for the complete range of component specifications and to ensure that all possible, however remote, measured values by any and all sensors are tested. A suitable readiness procedure, in one or more embodiments, also considers the societal and regulatory issues surrounding the use of inventive Systems. This advantageously helps to minimize delay.

Consider the following exemplary scenario wherein the weather modification program requirement was to apply hygroscopic seeding material. It involves programmed thresholds based on analysis of existing measured drop size distribution and their relationship to the production of rain, and similarly based on analysis of measured below cloud-base aerosol size distribution data. A single non-ground-based fixed wing 'Intelligent' System, equipped for seeding with hygroscopic material (i.e., table of FIG. 5, airborne-seeding or middle capabilities column) and a sensor payload that includes the sensors in the table of FIG. 6, flies through the candidate cloud and determines if the measured values indicate a broad drop size distribution with a tail of large drops. Then, after leaving the cloud, the vehicle automatically flies toward and under its cloudbase level to find that same cloud's updraft while its processing system compares aerosol size distributions to the seeding threshold distribution. If large hygroscopic aerosol particles are present below the cloud base, then seeding does not start, for example.

We have found that this activity can be enhanced using, simultaneously, two fixed winged 'Intelligent' Systems in tandem, making this entire process occur quicker, with seeding starting sooner and optimizing success with respect to increasing the efficiency of the cloud system ability to form rain and then having that additional rain fall in the designated watershed, for example. Using two 'Intelligent' Systems involves one flying above cloud base concurrently with the other flying just below cloud base in the example. Each 'Intelligent' System has a similar sensor payload, with, in this example, one at cloud base also containing a seeding system. A conventional seed aircraft would not likely carry the instrumentation to determine the below cloudbase aerosol size distribution, and might have low resolution droplet distribution information from somewhere above the cloud base estimated by radar, radiometer or satellite sensors. The System (UAS1 105-1) climbs to the −5° C. isotherm 151 while the other system (UAS2 105-2) profiles downwind of UAS1 105-1. UAS1(105-1) profiles the atmospheric parameters from the surface and up to the cloud top level and then from near surface up to cloud formation level (CFL) or the cloud base as specific conditions warrant until the information about the existence of a candidate cloud is received, at which time is moves to the operations level 151. UAS2 105-2 profiles the atmospheric parameters from the surface and up to the higher operational atmospheric level 153 or the cloud top level as specific meteorological conditions warrant until the information about the existence of a candidate cloud is received. Both Systems fly in formation while approaching the candidate cloud 143 and while keeping a safe minimum separation of 100 to 300 m. Once near the cloud 143, each System assumes its position and commences its seeding mission profile where UAS1 105-2 penetrates the cloud and UAS2 105-1 samples the cloud updraft near the CFL. Once the seeding mission stops, each System loiters, while collecting data, until each receives its next action directing it for more sampling inside the system it has just seeded, which may involve a series of cloud penetrations and sampling of aerosols below cloud base (while maintaining separation).

One or more embodiments of the invention have an inherent framework that automatically facilitates the independent evolution of its technologies without disrupting their operational use. This translates into maintaining streamlined cloud seeding operations, smaller operational footprints, and lower cost, while optimizing seeding operations effectiveness (compared to current cloud seeding programs).

One or more embodiments of the invention provide smarter use of available and preferably recently-developed technologies that yield actual information about the actual environment in and around the activity, and employ that information in near-real-time to adapt the path toward the ideal seeding location, and use data from their sensor payloads to optimize the seeding agent dispersal via their seeding systems. In contrast, conventional cloud seeding methods, whether manned aircraft or ground-based, rely on rudimentary meteorological data available from manned aircraft, hour old environmental data, weather radar data, model data, and archived data to carry out their seeding operations, or operate from data averaged over a period longer than the cloud scale processes that does not coincide well with the time of the weather modification or cloud seeding activity was conducted, for example. Hence, conventional operations have comparatively less data and poorer quality data. This not only means less than optimal seeding effectiveness, but also translates into less accurate evaluation results. The latter is remedied by one or more embodiments and the data used in conventional methods is still available, but becomes ancillary/auxiliary.

Operational cloud seeding projects (ANSI/ASCE/EWRI 2013; ANSI/ASCE/EWRI 2015; ANSI/ASCE/EWRI 2017; Keyes et al. 2016) are capable of dispersing supercooled fog, increasing precipitation amounts by up to about 10% and possibly minimizing the damage from hailstorms compared to natural systems, despite, for example; (a) complexity of the cloud systems and their interactions with their surrounding environment, (b) inadequate readiness of the technologies to sense the environment to be treated (in a) under weather modification activities, (c) insufficient data (i.e., remote areas are data starved and measurement systems are costly and logistically involved), (d) measurements not made at an adequate spatial and temporal frequency to satisfactorily reproduce their true natural state, and (c) the sensors themselves are designed to measure a dependent variable. For example, an instrument measures liquid water content. Liquid water content, which is commonly used in seeding operations, can be the same value for two clouds to be seeded despite their cloud drop sizes being different. The latter adds risk to the result of the operation, if the seeding strategy doesn't adequately match with the true cloud droplet population characteristics.

The impact to the environment using contemporary glaciogenic seeding agents is minimal if any. It does not appear that there are any negative environmental impacts due to contemporary hygroscopic seeding at this time. The use of manned aircraft, which is arguably the most common platform for cloud seeding, does extend the application of contemporary weather modification activities into remote and orographic regions. See also above discussion of pilot risk associated with use of manned aircraft for cloud seeding. The cost to secure the manned seed aircraft, its seeding system and an instrumented aircraft to support research and development cost millions to obtain and have nearly equivalent costs to maintain. In contrast, ground seeding systems are many orders of magnitude less costly to obtain and maintain in comparison. Ground seeding system deployment can be a challenge, usually in data-starved regions, and their siting requires modeling to ensure the seeding material gets into the appropriate clouds, especially in mountainous, hilly and lightly vegetated, if any, arid terrain (e.g., Keyes et al., 2016).

Referring to the table of FIG. 7, one or more embodiments overcome the shortcomings of the current methods for cloud seeding activities. One or more embodiments also comparatively improve seeding effectiveness and the significance of their evaluation. One or more embodiments, as a result, may even change the strategies employed in seeding compared to those currently used. One or more embodiments provide the value added data to support research and development efforts required to ensure such shortcomings remain insignificant, until an organized national comprehensive research and development program can be established (e.g., DeFelice, 2002; Golden and DeFelice, 2006). Current operational weather modification/cloud seeding activities rarely include research and development tasks due to their high cost and low additional benefit to the operations program sponsor. Current program sponsors obtain significant benefit from employing the current technology. Hence, research and development funding remains scarce at best.

One or more embodiments of the invention do not require the need for any manned aircraft with or without autonomous-adaptive sensors, hence that risk is mitigated. Those pilots can be cross-trained to fly and monitor the "'Intelligent' Systems," and the maintenance team trained to handle any maintenance. The costs of the systems, and their maintenance in this method is a factor of 5 to 50 times less than their manned, larger counterparts of the current, contemporary method, even after accounting for the newness of any technology, longevity of platform and retraining.

Figure 3:
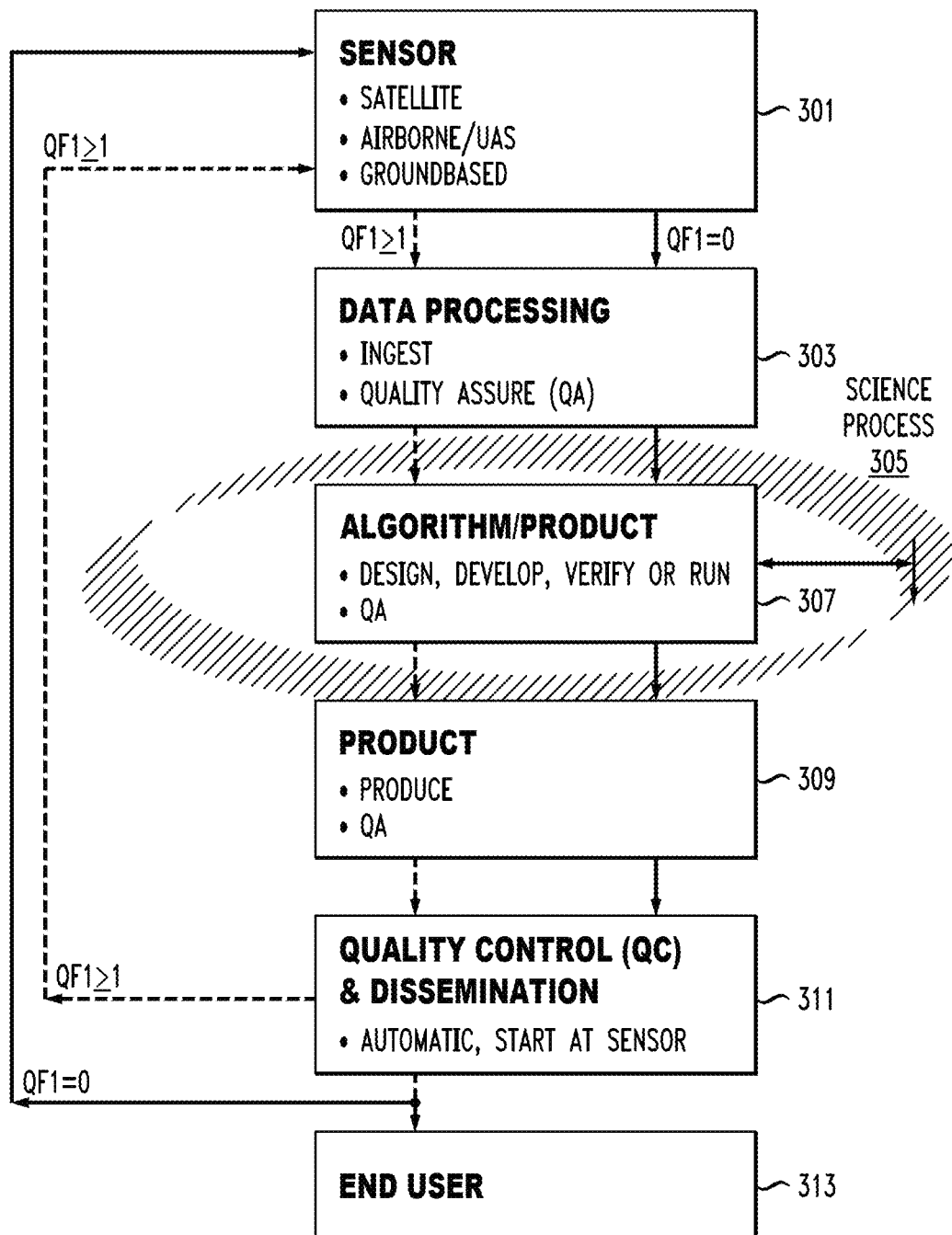
FIG. 3 depicts development and data flow processes of autonomous UAS/UGV systems with adaptive control (i.e., airborne/ground-based 'Intelligent' Systems). In this figure, 'Product' is the main goal of each step. The QA, or quality assurance, and dissemination step is the delivery or the end point of each step (i-vii).

Relative to using one or more embodiments, it is cautioned that, even though small UAS have operated successfully in the vicinity of thunderstorms, and technologically can be used to conduct weather modification research and operations, thorough safety investigation should be made in a particular use case; for example, the several issues and risks should be analyzed via engineering trade studies for weather modification activities before adopting them as set forth with regard to FIG. 3 and detailed description elsewhere herein. The cloud systems associated with weather modification activities are often complex, and/or they occur in regions with complex terrain or ecosystems. Hence, appropriate safety considerations should be observed; for example, the pilot/driver of a UAS, and especially tied to an "Intelligent' System' used for weather modification activities, should at least have an equivalent amount of flight time and training as would a pilot for manned aircraft weather modification activities. In a non-limiting example, assume that the 'Intelligent' System is appropriately sized, optimally configured with respect to each functional mode (see table of FIG. 5), and configured (see FIG. 2) appropriately for each weather modification program activity.

The implementation of "Intelligent' Systems', the adaptability of their use to multiple applications and ability to continually infuse new technologies is generally achievable by the skilled artisan, given the teachings herein, coupled with the adaption of industry-disciplined science and engineering fundamentals and their application for cloud seeding, weather modification operations and research and development, particularly optimized for using "Intelligent' Systems' for advertent and inadvertent weather modification and/or cloud seeding program/activities. The following are provided to facilitate the understanding of embodiments of the invention and to help ensure the successful use of embodiments of the invention by the skilled artisan. Given the latter, the process for developing the 'Intelligent' System for either role (seeding, evaluation/monitor, or both) can generally follow these steps:

i. Determine and verify the requirements of the application.
ii. Identify, design, develop, test and document the sensing payload that will optimally provide temporal, spatial (and spectral) sensitivities within the requirements set under step (i) to overcome the predictability or sparseness of environmental parameters, the threshold values for seeding.
iii. Design, develop, test and document the information processing system for producing and disseminating the information obtained by the sensing suite from step (ii). This includes using the in situ and other real-time sensor data to guide the platform, if an airborne 'Intelligent' System, towards suitable targets to implement the seeding, and the use of the payload data to identify suitable conditions for optimal seeding; or alternatively if a ground-based 'Intelligent' System, using the in situ and other real-time sensor data to identify suitable conditions for optimal seeding, initiate/terminate seeding and dispense the appropriate material.
iv. Design, develop, test and document the Command, Control, Communications, Computers, Intelligence, Surveillance, and Reconnaissance (C4ISR) for this system. This includes verification of the proper operation of the simulation (and machine learning) software modules, including training with any available training corpus and verification with any available test corpus.
v. Design, develop, test and document the optimal integration scheme of the payload sensor suite, processing system, protection, and C4ISR (defined in table of FIG. 5) components on the sensor suite identified under step (i).
vi. Integrate (ii) through (iv) and test operability.
vii. Perform optimization trade studies as needed. Return to step (ii) if the result changes design.
viii. Field test, develop, deploy, and maintain system.

FIG. 3 illustrates the processing of the Sensor 275, 255 and other data 293 into quality data used to determine when to start/stop seeding, or where the candidate cloud is located, for example. This data processing flow occurs with an optimal interaction between an engineering process and a development or scientific process. The data processing system is a pertinent aspect of the "'Intelligent' System". As will be appreciated by the skilled artisan, the effort under each of the steps (i)-(viii) can be similarly demonstrated as steps 301, 303, 305, 307, 309, 311, 313 under FIG. 3. Each step (i-viii) is implemented in an adaptable development cycle. That is to say, in one or more exemplary situations, the steps 301-313 of FIG. 3 can be repeated for each of the Roman numerals (i)-(viii). Furthermore, step (vii) is intended to not only improve the performance as an entire system but it also provides the opportunity to insert new technologies. Axisa and DeFelice 2016, and DeFelice and Axisa 2016 provide some additional details. Thus, as noted, FIG. 3 depicts development and data flow processes of autonomous UAS/UGV systems with adaptive control (i.e., airborne/ground-based 'Intelligent' Systems). In this figure, 'Product' is the main goal of each step. For example, the main goal of step (i) is the requirements agreed upon for the seeding program contracted. The main goal of Step (ii) is to identify the sensors to be used in the operational program, such as those in table of FIG. 6. The main goal of the sum total of steps (i-viii) is an operational version of vehicles 113 and/or 105. The QA, or quality assurance, and dissemination step 313 includes the delivery or the end point of each step i-vii to be tested in the field or in an actual operation. Note that "QF1"=Quality Flag per first pass. The arrow between "science process" 305 and step 307 is a two-way arrow.

FIG. 3 thus depicts an exemplary fundamental process including an engineering process and a science Development process 305, and how they interact. In one or more embodiments, each step (i)-(viii) is implemented following this same process as illustrated in FIG. 3 as appropriate according to the details. Step (iii) provides a comprehensive example of what is illustrated by FIG. 3. Following FIG. 3, in the example, begin with the data collected (corresponding to 'Sensor' block 301); make sure the information to be used in the engineering trade study is quality assured (ingestion and QA in block 303); then perform the trade study and corresponding experiments that yield results; analyze those results (block 307); and produce the final product or output as needed per situation in block 309. In one or more embodiments, the results are disseminated to the next and/or all subsequent steps (i-viii), via documentation, a suitable data structure, or the like. For each pass through the entire set of steps (i-viii), reset the quality flag (QF) and start all over; it being noted that following Product block 309 QC and dissemination to end user 313 take place in block 311.

FIG. 3 thus illustrates, for example, the Sensor 275, 255 and other data 293 being processed into quality data used to determine when to start/stop seeding, or where the candidate cloud is located, for example. This data processing flow occurs with an optimal interaction between an engineering process and a development or scientific process.

One or more embodiments of the invention can advantageously employ innovative seeding materials based on potential seeding agent technologies and delivery technologies after successful completion of an integrative development process as disclosed herein. This ensures optimal and long lasting successful use of each 'Intelligent' System in weather modification or cloud seeding activity.

Regarding seeding agent technologies, see, for example, Carrasco J, et al., "A one-dimensional ice structure built from pentagons," Nature Materials, 8(5), 427-431 (2009) (hereinafter, "Carrasco et al. 2009"); Lou, Y. G. et al., "A comparative study on preparation of TiO2 Pellets as photocatalysts based on different precursors," Materials Science Forum, 475-479, 4165-4170 (2005) (hereinafter "Lou et al. 2005"); Zhang, W. et al., "Photocatalytic TiO 2/adsorbent nanocomposites prepared via wet chemical impregnation for wastewater treatment: a review," Applied Catalysis A: General, 371(1-2), 1-9. (2009) (hereinafter "Zhang et al., 2009"). The complete disclosures of Carrasco et al. 2009, Lou et al. 2005, and Zhang et al., 2009 are hereby expressly incorporated herein by reference in their entireties for all purposes, although the skilled artisan will be generally familiar with same.

Regarding delivery technologies, see, for example, Hill, G. E., "Laboratory calibration of a vibrating wire device for measuring concentrations of supercooled liquid water," J. Atmos. Ocean. Technol. 6 (6), 961-970 (1989) (hereinafter "Hill 1989"); Hill, G. E., "Radiosonde supercooled liquid water detector," Final Report delivered in September to U.S. Cold regions Research & Engineering Lab., Hanover, NH for Contract DACA 89-84-C-0005 (1990), Atek Data Corp, 2300 Canyon Blvd., Boulder, CO 80302 (97 pp.) (hereinafter "Hill 1990"); and Hill, G. E. et al., "A balloon-borne instrument for the measurement of vertical profiles of supercooled liquid water concentration," J. Appl. Meteorol. 19, 1285-1292 (1980) (Hereinafter "Hill and Woffinden 1980"). The complete disclosures of Hill 1989, Hill 1990, and Hill and Woffinden 1980 are hereby expressly incorporated herein by reference in their entireties for all purposes, although the skilled artisan will be generally familiar with same.

Successful implementation of one or more embodiments can be optimized by employing the following management and implementation guidance, which is an extension beyond the current standard industry practices in weather modification programs. Refer to ANSI/ASCE/EWRI 2013; ANSI/ASCE/EWRI 2015; ANSI/ASCE/EWRI 2017; and Keyes et al. 2016.

In particular: (i) Ensure and adapt a viable, program (/activity)-specific tailorable balance between practice, societal, science, technology and engineering cultures during the entire program through a program management entity (herein arbitrarily labeled PMO). (ii) The PMO is led by a single person (Program Lead) tied to only one entity, organization or company, and contains solution-defined functional core members. The PMO lead implements the Program, ensuring horizontally and vertically integrated communication among the entire Program workforce with appropriate communication frequency and content with program sponsor and stakeholders. (iii) Each functional team is led by its leader (who is a core functional member of the PMO). (iv) Each team should be allowed to work 'pseudo'-autonomously on a self-contained component during the project. No team deliverable, especially, should be 'owned' by multiple teams. (v) Ensure an innovative communicative, safe environment that respects each entity's policies and propriety concerns, while enabling all to improve activities without being bound by traditional 'boxes.' The latter would not penalize one for having a different idea. (vi) All staff (assuming they have the relevant skills), stakeholders and/or sponsors, and generally everyone want the activity/program to succeed, want or are willing to get along with all others, and want or are willing to collectively bring their best efforts forward always. (vii) Have plans to overcome challenges from; cultural differences, the ways 'we used to do these programs', and thinking out of their normal 'boxes'.

Use of one or more embodiments advantageously overcomes the technical and operational challenges of current, cloud seeding or weather modification activities. This is especially significant when factoring in the increasing population growth and increasing desertification across the globe (whether rooted in inadvertent weather modification activity or not). There is an impending life critical need to overcome the data gap required to identify suitable clouds and to smartly seed them such that the result lands in the indicated target area. Thence the need to improve on the seeding materials, the methodology for conducting weather modification activities, the technologies (e.g., seeding system, models, decision support tools, data processing system), for integrating new, ancillary and/or auxiliary technologies (i.e., improved and/or new more efficient technologies).

The following references are also incorporated herein by reference in their entireties for all purposes, although the skilled artisan will be generally familiar with same: Bates, T. S. et al., "Measurements of atmospheric aerosol vertical distributions above Svalbard, Norway, using unmanned aerial systems (UAS)," Atmos. Meas. Tech. 6, 2115-2120 (2013) (hereinafter, "Bates et al. 2013"); Elston, J. S. et al., "The tempest unmanned aircraft system for in situ observations of tornadic supercells: design and VORTEX2 flight results," Journal of Field Robotics, 28(4), pp. 461-483 (2011) (hereinafter, "Elston et al. 2011"); Lin, Po-Hsiung, "Observations: the first successful typhoon eyewall-penetration Reconnaissance flight mission conducted by the unmanned aerial vehicle," Aerosonde. Bull. Am. Meteorol. Soc. 87, 1481-1483 (2006) (hereinafter, "Lin 2006"); and Ramana, M. V. et al., "Albedo, atmospheric solar absorption and heating rate measurements with stacked UAVs," Q. J. R. Meteorol. Soc. 133, 1913-1931 (2007) (hereinafter, "Ramana 2007").

Embodiments thus provide a paradigm shifting methodology and framework for using 'Intelligent' Systems (as defined elsewhere herein) during the performance (i.e., identify, conduct, monitor) and/or evaluation of weather modification and cloud seeding activities for precipitation enhancement and augmentation, hail suppression and fog dispersal. Embodiments provide, for example, one, some, or all of a smaller operational footprint, safer operations, use of in situ and remote sensor data to guide and evaluate program activities, more versatile and autonomous seeding platform, and enhanced 'practice' framework.

One or more embodiments are also applicable for quantifying the extent of, and for supporting the objectives of a multi-disciplinary solution for inadvertent weather modification activities.

'Intelligent' Systems in one or more embodiments include autonomous systems with adaptive control. Autonomous systems could be autonomous unmanned aircraft or ground (mobile, tethered and stationary) systems with adaptive control, autonomous unmanned aircraft or ground systems without adaptive control, unmanned aircraft or ground systems (UAS/UGS) with or without adaptive control, unmanned aircraft or ground vehicles (UAV/UGV) with or without adaptive control, manned aircraft or ground systems, Rocket delivery of seeding material with or without autonomy and/or with or without adaptive control, instrumented towers (including with a seeding system), ground-based seeding systems with or without adaptive remote controls, instrumented balloons (including with a seeding system), mobile and static observing systems equipped with seeding dispensers, and also any combination of these systems, not just each in isolation (e.g. UAV swarm, ground-based networked system). As used herein, 'adaptive control' refers to the improved performance and increased robustness of an autonomous system by configuring its control system to adjust the seeding action as a function of measurements as it fulfills its mission objective, (e.g., target and implement seeding, evaluate seeding effectiveness) also referred to as adaptive autonomy. 'Adaptive control' for ground-based autonomous systems refers to the improved performance and increased robustness to identify when the seeding system needs to be turned on/off, determine seeding rate, and ultimately which seeding material needs to be dispensed.

Exemplary autonomous systems with adaptive control, or "'Intelligent' Systems," can be guided by remote sensors (e.g., ground-based, including radar/radiometer, aircraft if available, and/or satellite) and/or 'in situ' or 'Intelligent' System platform-based sensor(s) to provide target locations for seeding. The sensor suite (payload) provides 'in situ' atmospheric/environmental data needed to identify conditions suitable for seeding or other specified action.

'Intelligent' Systems of one or more embodiments, especially if airborne, are typically capable of carrying the weight of the sensor payload, seeding system, data management and software controlled components/aspects (refer to the table of FIG. 5) in the most severe atmospheric conditions without any component failure and operate to fulfill mission requirements for seeding.

'Intelligent' Systems of one or more embodiments contain secure interfaces with their on-board sensor payload, data management, models and software controlled components. 'Intelligent' Systems can also interface securely with other observing systems and/or other technology for use in weather modification programs to carry out operational activities or to monitor and evaluate them.

The data management system for the 'Intelligent' System used in one or more embodiments has the computational throughput and capacity to handle the data volumes generated for at least an entire program mission and activity. The data management system encompasses the on-board data processing system with remote access, the configured interfaces with the control system, seeding system, communications, sensor payload and the auxiliary/ancillary connections, machine learning as described herein, as well as corresponding software for all platform functions. In one or more embodiments, the data management system seamlessly ingests, in near real-time, the sensor payload data 255, 275 (i.e., temperature, relative humidity, 3D wind field, pressure, aerosol size distribution and droplet size distribution, other as required), auxiliary/ancillary data 293 (e.g., external source information about cloud locations, topography, "standard" flight paths (i.e. work with local regulatory authority to obtain pre-approval for certain flight paths), seeding locations based on convection or other defined criteria, information from other 'Intelligent' Systems 113, 105, satellites, radar, data archives), seeding action data 245, 265 and autopilot 269, 249 data. The system with the help of a ground control station computer performs a QA on these data.

Exemplary improvement obtained in one or more embodiments includes a seeding action, where and when to seed determined by the seeding system software that extracts ancillary/auxiliary and platform sensor data inputs, with a capability to have pilot override. When to seed primarily uses the platform sensor data once 'where' is determined. What seeding material to dispense, if not pre-determined, can be determined by platform sensor data, primarily, and as needed auxiliary/ancillary data. For example, the seeding system software ingests and extracts the time-stamped data entries that fall within threshold values of operational quantities to determine when to seed, and what material to dispense if not predefined. The threshold values of operational quantities come from the on-board sensor payload, which include environmental (e.g., 3D winds, temperature, relative humidity, pressure), aerosol and cloud microphysical properties (e.g., aerosol concentration, aerosol chemistry, aerosol hygroscopicity, drop concentration, drop size distribution, effective drop size, hydrometeor size, hydrometeor type, ice-cloud depolarization ratio). The data are quality controlled using a simple test (e.g., data range test), and processed in real time (e.g., passed through low pass filter) to provide data that describe the measured atmospheric/environmental parameter of interest (e.g. updraft velocity, droplet size and corresponding droplet concentration, and aerosol size and corresponding concentrations). These data are then passed through a series of if/then statements which essentially encompass the threshold criteria to indicate seedability. If the thresholds are met, then seeding occurs in accordance with the environmental conditions and the chosen material to be dispensed. For example if hygroscopic seeding material is used, then it can, for example, be dispensed at cloudbase or at ground level; whereas glaciogenic material might be dispensed at cloud base, cloud top or at ground level, while it and other systems continue to make sensor measurements, collect ancillary/auxiliary data and manage their programmatic roles. The thresholds are also used to establish natural variability, address scientific research and analyses, and in some circumstances, are relatable to control cases if seeding occurred in a nearby cloud.

One or more embodiments of the invention include an improved ability of each 'Intelligent' System to navigate toward candidate cloud area where seeding is probably effective based on the location coordinates provided. The location coordinates can be obtained from the auxiliary/ancillary data inputs and processed, such as by a navigation control-like module, onboard the system. The skilled artisan will appreciate that all regulatory requirements should be complied with, and reasonable and prudent precautions taken; for example, in jurisdictions and/or under conditions that dictate same, pilot over-ride should preferably be available at all times. The navigation control-like module can contain an autonomy routine, or equivalent, which performs a nowcast of the real-time ingested ancillary/auxiliary location coordinates and platform sensor data (see table of FIG.

5). The output of the autonomy routine, or equivalent, is then fed back into the navigation control-like module and the system then adapts its path accordingly with ongoing in situ sampling as it heads to those new locations. The autonomy routine, or equivalent, continuously updates seeding coordinates throughout the flight, but once the 'Intelligent' System reaches the ideal location, seeding begins and ends once the sensors indicate favorable and then unfavorable seeding conditions, respectively. The seeding cycle continues, for example, until the UAS must return for fueling or there is an unsafe situation, at which time a replacement system will be in place to continue the activity. The ground control station (GCS) computer can have pre-defined flight plans from mission control software and the position data to generate initial navigation coordinates for each 'Intelligent' System. Conventional systems use radar and pilot, or just radar and surface observations to turn on the ground generators. The information used by conventional systems not employing embodiments of the invention is not always available or if it is available it is very far away and might not be relevant (e.g. of course resolution and/or poor quality).

One or more of embodiments of the invention also include an improved, built-in, ability to conduct randomized seeding (operations or experiments). That is, using inventive techniques involving, e.g., radar and/or UAV(s), candidate clouds are chosen with minimal human bias, if any, and then seeded randomly again with minimal, if any, human bias. See row "g" of FIG. 7 for example.

Embodiments include the improved ability of each ground-based (stationary, tethered, and mobile) 'Intelligent' System to be autonomously controlled remotely and use its concurrent sensor payload or model simulated data to identify when systems are seedable, select the seeding material, decide when to turn on all, one or none of the systems, and continue the seeding operation until the conditions have ended. The remote control can be performed by model guidance. Hence the model turns on the system, not a human, in one or more embodiments. One or more embodiments provide the capability for human over-ride. The model guidance is based on the data from the intelligent ground systems. That data are processed to control the start and stop seeding actions as well as to control the type of material dispensed, and to keep track of the total amount dispensed. Each 'Intelligent' system 105, 113 also provides alerts for reloading the seeding materials, and even communicates extreme weather conditions. Once seeding ends each system continues to make measurements as required. Further, non-seeding 'Intelligent' Systems in an array of ground-based 'Intelligent' Systems can be collecting data throughout the same period, concurrently with the systems that were seeding. Conventional practice is to have a local or remote operator physically turn on or dial up the ground seeding generators based on commercially available information that may or may not be timely, or locally relevant.

Embodiments include an improved ability for each 'Intelligent' System transmitting data (i.e., payload, seeding system software, auxiliary/ancillary and autopilot) to the ground control station (GCS) automatically via telemetry for archive and computationally intensive processing. The results from computationally intensive processing can be sent back to the 'Intelligent' System data management system. Further, each 'Intelligent' System is typically able to communicate with each other throughout a program. A beneficial improvement in one or more embodiments includes the case of obtaining needed information to conduct and evaluate seeding actions compared to conventional pilot data. The first job of the pilot is to fly his or her plane. The format of his or her information is rarely digitized and typically handwritten when safe to record, which might be well after the final flight for the day. Radar data might be available in some current systems, but with special software and retrieved after-the-fact with meteorological and stream data.

One or more embodiments allow inventive technologies to evolve independently of their use. This translates into more streamlined cloud seeding operations, smaller operational footprint, and lower cost (compared to contemporary cloud seeding programs), while enhancing or even optimizing the effectiveness of seeding operations. An exemplary improvement includes the use of more accurate and safer technologies, compared with the decades old technologies used for conventional cloud seeding. The use of the routinely obtained data from this invention can provide additional data to enhance the accuracy and development of decision support tools applied to current cloud seeding activities.

One or more embodiments provide data at temporal and spatial sensitivities to overcome the predictability or sparseness issues of environmental parameters needed to identify conditions suitable for seeding, and how such might be implemented. These data will also be readily available for post event evaluation. Current operations often require after-the-fact retrieval of data for evaluations that are not always readily available (and even if available might not be relevant in time and space, for example). Furthermore in this regard, consider that the data obtained after the fact might not be the exact same parameter; e.g., the needed data might be hydrometeor size, but instead the only available data obtained might be liquid water content. While liquid water content is related to hydrometeor size cubed and number density, since the data are obtained after the fact, assumptions would have to be made to obtain the size. Those assumptions cause uncertainties, and if used to improve a decision support model could lead to poor quality decision support models, that we will (erroneously) be assumed to reflect reality. Conventional cloud seeding methods, whether manned aircraft or ground-based, rely on data from larger than local/regional scales to conduct their localized cloud seeding operations. These data are usually at extra costs as well.

One or more embodiments are not limited to specific sensing technologies, seeding delivery systems and their agents, niche components, models or algorithms, and decision support tools for operations and operational effectiveness, beyond the high level functional needs and the method employed to guide successful use during weather modification activities as described elsewhere herein. That is, embodiments of the invention are not limited to any particular design or fabrication technique for the 'Intelligent' System itself. The present specification describes the required capabilities of those 'Intelligent' Systems including the adaptive autonomy as a function of their application, and the methodology and framework to be employed for their optimal use in weather modification or cloud seeding program activities, so that the skilled artisan can readily make and use embodiments of the invention without undue experimentation.

Embodiments allow "'Intelligent' Systems' that are non-ground-based or airborne, to be flown separately, or in a swarm, or in tandem (i.e., two or more) to perform a seeding action, and/or in Eulerian and/or Lagrangian framework with or without profiling to best meet the requirements of the seeding activity. Embodiments allow "'Intelligent' Systems" that are ground-based to be used individually, or in a network/array configured and controlled to ensure optimal coverage of the seeding material in the targeted cloud systems in a manner to best meet the requirements of the seeding activity. The seeding can come from any one, some, or all of the systems. All systems can have their sensor payload sensors activated throughout the seeding period and beyond.

Embodiments provide a more 'intelligent,' safer way to conduct and/or evaluate weather modification or cloud seeding or inadvertent weather modification operations, which lowers the cloud seeding operational footprint and cost, while optimizing operational effectiveness and efficiency compared to current ways to conduct and evaluate such programs. Results from the use of sparse environmental information can lead to very costly, wrong decisions or actions, which may result in disastrous events. Embodiments also provide value added benefits to a number of communities, for example, at no cost to the sponsor: (i) a more accurate understanding into cloud processes and the environment (being seeded while at the cloud performing the seeding), leading to a more accurate seeding operation and more accurate quantification of the impact by weather modification activities; (ii) a dataset that will help advance other science disciplines, improve weather forecasts, contribute to decision support tool development and use; (iii) a truly more intelligent, robust component of a multidisciplinary solution to minimize the negative impacts from socioeconomic issues related to population increase, ecosystem and land cover change, dwindling water supplies, water security, and their relation with the hydrological cycle; and/or (iv) Embodiments facilitate the capability of enhancing the quality of global lives. For example, embodiments can extend the infrastructure of more developing countries and countries with limited infrastructure, and access to technology that can help provide potable water to their people.

Some embodiments can make use of machine learning to determine and/or evolve optimal seeding locations and/or materials. Machine learning evolved from the study of pattern recognition and computational learning theory in artificial intelligence, and explores the study and construction of algorithms that can learn from and make predictions on data. Such algorithms make data-driven predictions or decisions, through building a model from sample inputs. Supervised learning, unsupervised learning, and/or reinforcement learning can be employed, for example. Artificial neural networks, decision trees, and the like are further non-limiting examples. As will be appreciated by the skilled artisan, generally, a cognitive neural network includes a plurality of computer processors that are configured to work together to implement one or more machine learning algorithms.

Unmanned aerial vehicles are commonly referred to as drones; they can be fixed wing and/or rotary wing and can, in some instances, also include rockets as appropriate as described herein. UAV designs include fuselage/wing assemblies resembling planes as well as helicopter and quadcopter configurations. Sensors such as gyroscopes, accelerometers, altimeters, GPS modules, cameras and/or payload monitors may be incorporated within UAVs. Gimbals may be used to mount payloads in UAVs. Radio signals generated by a transmitter/receiver, a smartphone, a tablet or other device can be used to control a UAV. UAVs can be designed to operate partially or completely autonomously. Functions such as hovering and returning to home can, for example, be provided autonomously. Data obtained by UAVs can be stored onboard using, for example, suitable memory, or transmitted wirelessly. UAVs can be provided with on-board processing capability and/or can wirelessly transmit and receive data from a remote controller which has, or is coupled to, computing capability.

Given the discussion thus far, it will be appreciated that, in general terms, an exemplary method, according to an aspect of the invention, includes obtaining data including current locations of candidate clouds 143 to be seeded. A further step includes, based on the data including the current locations of the candidate clouds to be seeded, causing a vehicle (e.g., 105-1, 105-2, 113a, 113b) to move proximate at least one of the candidate clouds to be seeded. An even further step includes obtaining, from a sensor suite 255, 275 associated with the vehicle (e.g., via telemetry 289, 291), while the vehicle and sensor suite are proximate the at least one of the candidate clouds to be seeded 143, weather and cloud system data 293, 275, 255.

An additional step includes obtaining (e.g., via telemetry 289, 291) vehicle position parameters from the mission planner(s) 287-1, 287-2 using data from the sensor suite 255, 275 associated with the vehicle and data set 293. Another step includes, based on the weather and cloud system data 293 and the vehicle position parameters, determining, via a machine learning process, passed via telemetry 283-1, 283-2, 289, 291, 251, 271 to system autopilot or remote control 249, 269 and CPU 257, 277, which of the candidate clouds should be seeded; and as the system reaches the candidate clouds for seeding, adding the information from 255,275 obtained within the candidate clouds 143 where to disperse an appropriate seeding material. In a non-limiting example, the machine learning takes place between the ground systems 109 and the vehicles using the data 293, and the data from 113 and/or 105.

It is worth noting that, in a conventional system, what material to use is predetermined. Examples include, for seeding, AgI, Dry Ice, or others e.g., using nanotechnology, titanium oxide-coated materials. However, in one or more embodiments, what material to be used for seeding can also be determined from among multiple possibilities via machine learning. One or more embodiments use thresholds for the seeding start/stop decision; i.e., when to turn the dispensing system on and off. Machine learning is used in one or more embodiments to determine which cloud to seed and where to put the seeding material. In one exemplary aspect, a sophisticated decision tree classifier within the mission planner 287-1, 287-2 uses all data, including that from onboard sensors 255, 275 and radar (in dataset 293), to guide the UAV 105/UGV 113 to the cloud system 143 and determine when to seed. The gathered data are also available for next time—that is to say, in one or more embodiments, both real time data, and stored data 247, 267, 281-1, 281-2 are used. For the next use, historical data plus data from the last use will be available. Ground-based systems will typically be located in a cloud (for example, because on a mountain top) or can be launched up into the cloud(s).

Still another step includes controlling the vehicle to carry out the seeding on the candidate clouds to be seeded, in accordance with the determining step; for example, via telemetry 291, 289 to telemetry radio 251, 271 communicates and/or with remote control 249, 269, and controls seeding dispenser 245, 265 or other dispensing system. Telemetry radio (251, 271) also provides weather alerts to GCS. The terminology "dispensing system" or "seeding dispenser" includes a wide variety of dispensing devices—cloud seeding chemicals may be dispersed by aircraft or by dispersion devices located on the ground (generators or pyrotechnics, in rare cases canisters fired from anti-aircraft guns or from within rockets). For release by aircraft, silver iodide flares, solution generators, or the like can be ignited and dispersed as an aircraft flies through the inflow of a cloud. When released by devices on the ground, the nuclei are carried downwind and upward by air currents after release into the candidate clouds.

The aforementioned weather and cloud system data can include, for example, atmospheric temperature; data indicating humidity; and at least one of atmospheric aerosol size distribution and atmospheric cloud hydrometeor size distribution. Data can be obtained, for example, inside, or just above the top of, or just below pertinent clouds 143. Appropriate locations from which data can be gathered are generally referred to herein as being proximate and or adjacent the cloud(s) during seeding; i.e., in a region where readings are relevant. One or more embodiments stop seeding when a seeding threshold is no longer met. Such start/stop decisions can be made, for example, based on atmospheric aerosol size distribution and/or atmospheric cloud hydrometeor size distribution 275, 255; in one or more embodiments, temperature data is also used to support the start/stop decision 255, 275, 293. Given the teachings herein, the skilled artisan will know at what temperature to start and stop seeding. Temperature data 255, 275 can be used in one or more embodiments to help pick the seeding material—e.g., whether to use dry ice or silver iodide. For example, in one or more embodiments, if the atmospheric aerosol size distribution and/or atmospheric cloud hydrometeor size distribution data appears to be favorable, verify that the temperature data indicates the correct temperature or that there is an updraft to take the material to a suitable location. This can be obtained, in one or more embodiments, using the sensor suites 255, 275 and processing onboard (via CPUs 257/277) 'Intelligent systems 105, 113 and at the ground control stations 109.

In some cases, the aforementioned weather and cloud system data further includes atmospheric pressure; wind components; and cloud imagery. In one or more embodiments, wind components for the three Cartesian coordinates (u,v,w or x,y,z or east-west, north-south, or ground to top-of-the-atmosphere) are obtained for both aerial and ground-based systems. As used herein, "cloud imagery" includes imaging with visible light (e.g. video) as well as imaging with infrared/non-visible light. Cloud imagery is a subset of "cloud system data." Video can be used, for example, for the guidance of a human UAS/UGV 105, 113 pilot or to take the place of a human operator when appropriate. In some instances, imaging is used to verify that the aerial vehicle is proceeding through the targeted cloud 143) and remaining within the targeted cloud—imaging, where appropriate, takes the place of a human operator. Image processing via ground control station computers 109 on the video or other imaging can be undertaken, and/or the video or a visual representation of the imagery can created for viewing and interpretation by a human. The results from such may be telemetered back to the source 105, 113 of the video imagery and used to guide those UAS/UGV vehicles 105, 113.

Of course, the rules of pertinent authorities (e.g., the Federal Aviation Administration or FAA in the USA or similar authorities in other jurisdictions) should be followed; for example, any rules requiring a human observer. In some situations, a ground-based human observer may not be able to see a UAV operating inside a cloud system; where appropriate, imaging can be used to observe the cloud and what is going on inside it—for example, a human controller observes via video. Alternatively, or in addition, some embodiments undertake real-time video processing and have a computer interpret the video images (e.g. using the Romatschke et al. 2017 analysis technique) and emulate the decisions that would be made by a human controller.

It is worth noting that electrostatic properties from an appropriate sensor 255, 275 can also be used in one or more embodiments to determine whether there is ice and water or just ice or just water in the cloud.

The aforementioned wind components can include, for example, magnitude and direction of three vector components.

The determinations made via machine learning can also, in some instances, include a rate at which to disperse the appropriate seeding material.

In one or more embodiments, the vehicle is an aerial vehicle; the sensor suite (e.g., 275) is on the aerial vehicle; the step of causing the vehicle to move proximate the at least one of the candidate clouds to be seeded includes via telemetry (e.g., 289) from ground control station 109 or operations center (e.g., 299) of output from mission planner (e.g., 287-2), causing the aerial vehicle to fly proximate the at least one of the candidate clouds 143 to be seeded; and the step of obtaining the weather and cloud system data includes obtaining the weather and cloud system data from the sensor suite 275 while the aerial vehicle is flying proximate the at least one of the candidate clouds to be seeded.

Note that aerial vehicles can generally be manned or unmanned, fixed wing, rotary wing, or even rockets.

In some cases, the aerial vehicle is an unmanned aircraft vehicle 105; the step of causing the aerial vehicle to fly proximate the at least one of the candidate clouds 143 to be seeded includes causing a first control signal to be sent via telemetry 289 from 109 of output from mission planner 287-2 to the unmanned aerial vehicle 105 to cause the unmanned aerial vehicle to fly proximate the at least one of the candidate clouds 143 to be seeded (e.g. via telemetry command(s)); and the step of controlling the aerial vehicle includes causing a second control signal to be sent to the unmanned aerial vehicle to cause the unmanned aerial vehicle to carry out the seeding on the candidate clouds to be seeded, in accordance with the determining step (e.g. via telemetry command(s)). For example, the system uses output from sensor algorithms 263 compared with 287-2, 281-2 information and returned via telemetry to the UAS (105) via radio 271 then through its CPU 277 to its seeding dispenser 265. "First" and "second" signals should be understood to include both (i) separate and distinct signals and/or (ii) different information modulated onto the same carrier.

In some cases, a further step includes obtaining ancillary data from a location other than the sensor suite on the unmanned aerial vehicle 293; the determining, via the machine learning process, is further based on the ancillary data 293. Examples of obtaining such ancillary data include obtaining from at least one of a manned aircraft; a radar installation 101, 111; and another unmanned aerial vehicle (e.g., UAS1 105-1 penetrates the cloud to seed while UAS2 105-2 samples the cloud updraft and the aerosol and cloud hydrometeor properties near cloudbase—providing at least a portion of the ancillary data). As noted, in some instances, real-time video imagery processing is carried out on video feed (or cloud imaging feed using non-visible light) from the unmanned aerial vehicle. This aids, for example, machine learning and/or controlling the drone to dispense seed material. In one or more embodiments, a computer interprets the video images and emulates the decisions that would be made by a human controller. Image processing via ground control station computers 109 on the video or other imaging can be undertaken, and/or the video or a visual representation of the imagery can created for viewing and interpretation by a human. The results from such may be telemetered back to the source 105, 113 of the video imagery and used to guide those UAS/UGV unit(s) 105, 113.

In some cases, the aerial vehicle is a manned aerial vehicle; and the controlling of the aerial vehicle to carry out the seeding on the candidate clouds to be seeded includes communicating (e.g., displaying) results of the determining step from the operations center 299 and in rare cases onboard radar to a human operator of the manned aerial vehicle. The human operator could be a pilot on the aircraft (human-on-board) who is trained to read radar data if available. In another aspect, results of machine learning from the ground control center computers 109 are displayed to a human-controlled UAS/drone operator to facilitate control of the UAS.

In another aspect, in a case where the aerial vehicle is an unmanned aircraft (UAS, 105), further steps include detecting an icing condition on the UAS (e.g. via sensors 275 and CPU 277, and sensor algorithms 263); and, responsive to the detecting, initiating a de-icing procedure. To determine icing condition in an unmanned vehicle, data can be obtained from a temperature, and airspeed sensors 275, and navigation-related components 269, 287-2. Ancillary data includes information needed to fly the craft. Video feed can also be used if available. If the vehicle is in a cloud, and thus near high humidity, temperature and humidity sensors can be used, for example. Some embodiments also monitor pitch, yaw, and air speed. The skilled artisan will be familiar with psychrometrics and will be able to determine, for example, that condensation will occur if the wing temperature is at or below the dew point. The wet bulb temperature can be used in lieu of the dew point. If the wing temperature is also at or below the freezing point of water at the ambient pressure, one can anticipate icing. Suitable de-icing solutions are available, for example, from Innovative Dynamics Inc. of Ithaca, New York. One or more embodiments activate a heater or other de-icing scheme when ice is detected.

Of course, manned vehicles can be de-iced in a known manner, as needed.

In instances where the vehicle is a ground vehicle, the step of causing the vehicle to move proximate the at least one of the candidate clouds to be seeded includes causing the ground vehicle to drive proximate the at least one of the candidate clouds to be seeded.

In one or more such instances, the sensor suite is on the ground vehicle; and the step of obtaining the weather and cloud system data includes obtaining the weather and cloud system data from the sensor suite while the ground vehicle is driving or stationary and is proximate the at least one of the candidate clouds to be seeded.

In some cases, the ground vehicle is an unmanned ground vehicle; the step of causing the ground vehicle to drive proximate the at least one of the candidate clouds to be seeded includes causing a first control signal to be sent to the unmanned ground vehicle to cause the unmanned ground vehicle to drive proximate the at least one of the candidate clouds to be seeded; and the step of controlling the ground vehicle to carry out the seeding on the candidate clouds to be seeded, in accordance with the determining step, includes causing a second control signal to be sent to the unmanned ground vehicle to cause the unmanned ground vehicle to carry out the seeding on the candidate clouds to be seeded, in accordance with the determining step. Again, "first" and "second" signals should be understood to include both (i) separate and distinct signals and/or (ii) different information modulated onto the same carrier.

In some cases, a further step includes obtaining ancillary data 293 from a location other than the sensor suite 255 on the unmanned ground vehicle 113; the determining, via the machine learning process, is further based on the ancillary data. Examples of obtaining such ancillary data include obtaining from at least one of a manned aircraft; an unmanned aircraft 105; a manned ground vehicle; a radar installation 101, 111; and another unmanned ground vehicle 113.

In some cases, the ground vehicle is a manned ground vehicle; and the controlling of the ground vehicle to carry out the seeding on the candidate clouds to be seeded includes communicating (e.g. displaying) results of the determining step to a human operator of the manned ground vehicle. That is to say, in one or more embodiments, results of machine learning from the ground control center computers 109 are displayed to a human to facilitate control of the UGV, a driver on ground vehicle (human-on-board) or human-controlled UGV.

In some instances, a further step includes determining, via the machine learning process, the appropriate seeding material to be used.

In one or more embodiments, the weather and cloud system data 293, 255 includes at least one of atmospheric aerosol size distribution and atmospheric cloud hydrometeor size distribution, and further steps include continuing to obtain at least one of atmospheric aerosol size distribution and atmospheric cloud hydrometeor size distribution during the seeding 255, until a threshold value of the distribution is crossed based on use of onboard sensor data 255, radar 293 data compared with mission planner-derived values 287-1 as described previously; and causing the seeding to cease when the threshold is crossed. In one or more embodiments, an initial pass indicates when and from where to begin seeding; the system then continuously monitors the sensors including temperature, windfield 255 and video 253 to determine when and from where (if an array of ground sensors) to stop. Thus, one or more embodiments continue to monitor while seeding, obtaining the relevant parameters from the platform sensors.

In one or more embodiments, a machine learning module (including, for example, the components from within the ground control center computers 109) is trained from historical 281-1, stored 247 and/or sensor data 255 as previously defined herein on an annotated corpus. That is to say, a body (corpus) of data from any appropriate source(s) is annotated by a human expert and then used to train the machine learning system. Some portion of the data can be reserved for a test corpus. The step of determining via the machine learning process is then carried out with the trained machine learning module (preferably verified against the test corpus) and then passed back to the UGV 113 via telemetry 291, 251. It is worth noting that commercially available navigation system programs/flight planning software can determine a path to a point given its coordinates. One or more embodiments "wrap" such a program and/or modify the code of same so that it accepts the radar data 293, onboard sensor data 255, 275, and weather data 293 to help determine an appropriate and even optimal path to the cloud to be seeded. Once there (i.e., at cloud 143), the actual data 255, 275 can be used to further enhance guidance.

Figure 8:
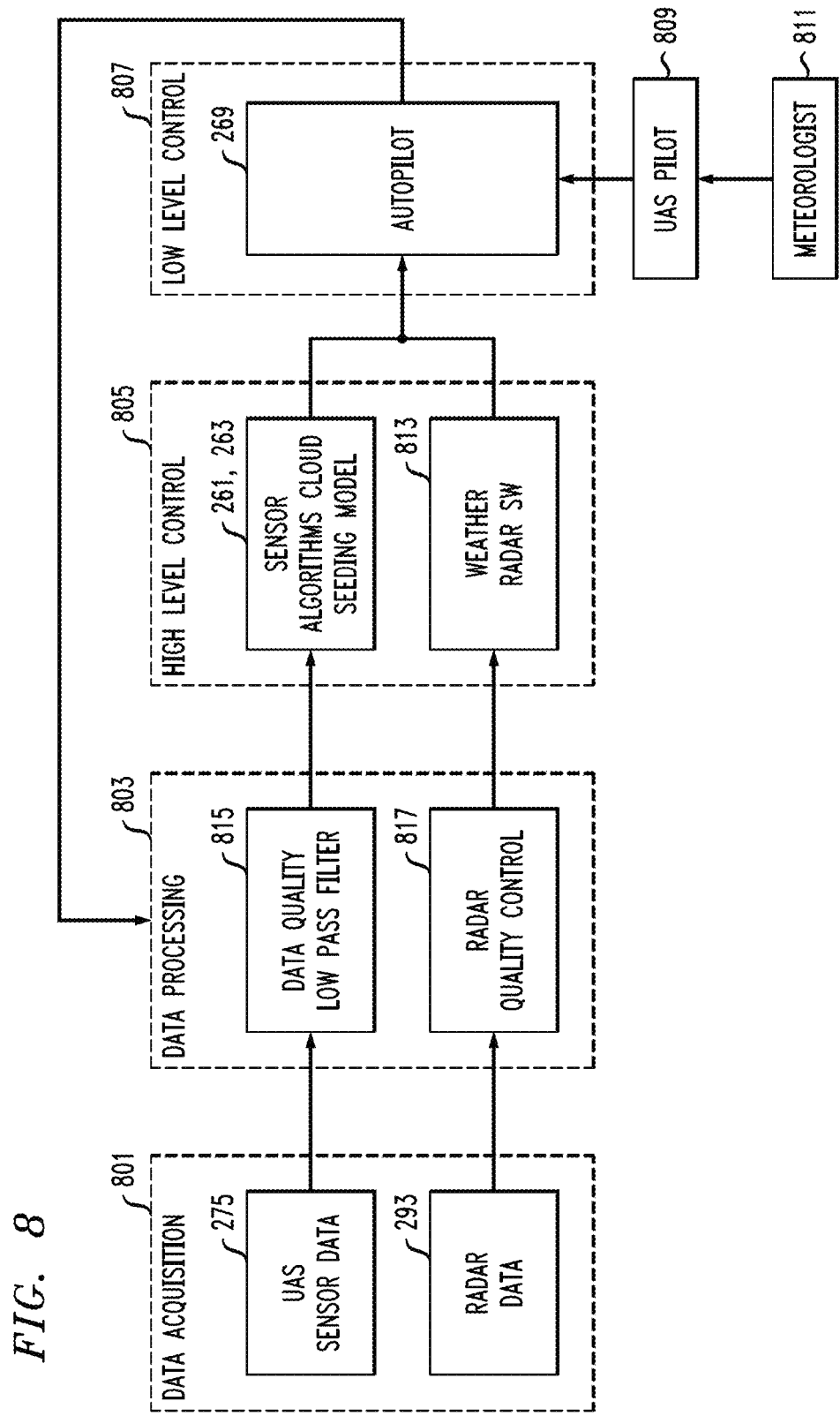
FIG. 8 is a block diagram showing exemplary data acquisition, data processing, and control aspects, according to an aspect of the invention.

Reference should now be had to FIG. 8; the same illustrates how the system integrates/links instrumentation on the payload with the flight planning software, radar, etc. reference is also again made to DeFelice and Axisa 2016. FIG. 8 thus provides a non-limiting exemplary illustration to assist the skilled artisan in implementing a system, including linking the various components such as the flight planning component, radar component which identifies the area where the vehicle starts looking for the place to do the seeding, and so on.

In one or more embodiments, an Autonomous UAS control routine 269 (equally representative of remote control 249) utilizes data from the mission planner 287-2 (equally representative of mission planer 287-1) for cloud seeding operations. Sensor data 275 (equally representative of sensor data 255) and radar data (from dataset 293), acquired in data acquisition block 801, are processed in a data processing block 803 by, respectively, data quality low pass filter 815 and radar quality control block 817. High level control block 805 then applies cloud seeding models 261 (equally representative of 241) to provide seeding actions to the UAS via 269 or UGV via 249. The data quality 815 is performed by the sensor algorithm 263 (equally representative of 243); the radar data quality control 817 is performed on the ground station CPU 287-2, 287-1. In a non-limiting example, the weather radar software 813 is the TITAN (Thunderstorm Identification, Tracking, Analysis, and Now-casting) software as known from Dixon M. et al., "Titan: thunderstorm identification tracking analysis and nowcasting a radar-based methodology," J Atmos. Ocean Technol. 10: 785-797 (1993) (hereinafter "Dixon et al 1993"), expressly incorporated herein by reference in its entirety for all purposes, although the skilled artisan will be generally familiar with same, as further modified to not only now-cast the location of convection, with real-time radar echo data input about the cloud environment, but also with sensor data input from the UAS, as described in DeFelice and Axisa 2016. The Sensor Algorithms and Cloud Seeding Model 261, 263 includes, for example, the inputs from the Sensor Algorithms 263 (equally representative of 243), and the cloud seeding model 261 as discussed elsewhere herein. In a non-limiting example, the cloud seeding model includes a coalescence model and appropriate modeling of ice crystal processes and the like, as will be appreciated by the skilled artisan. Algorithms and model 261, 263 are equally representative of 241, 243. Autopilot 269 provides low-level control 807 based on blocks 263, 813. A UAS pilot 809 and meteorologist 811 have the option to modify or interrupt the actions taken by the UAS. Elements 275, 815, 261, 263, 269 reside on the UAS system; elements 293, 817, 813 pertain to the radar system; and elements 809, 811 represent ground operations (e.g. 299).

As used herein, a vehicle is "proximate" a cloud or cloud system when it is within the cloud or cloud system, or near enough to the cloud or cloud system to obtain useful data. The skilled artisan understands the abilities of sensors and will know how close to a cloud a particular type of sensor needs to be to obtain useful data.

It is worth noting that atmospheric temperature could be, by way of example and not limitation, the dry bulb temperature; and data indicating humidity can include, by way of example and not limitation, relative humidity, absolute humidity, wet bulb temperature, dew point, mixing ratio, saturation mixing ratio, and the like—whatever parameters permit calculating humidity (if necessary, in conjunction with the dry bulb temperature)—the skilled artisan will be familiar with psychrometrics and the psychrometric chart.

Regarding wind components, the updraft velocity equals the magnitude of the vertical vector component.

It should be noted that atmospheric aerosol size distribution and atmospheric cloud hydrometeor size distribution can range from aerosols on the order of $10^{-4}$ microns up to $\sim 2\times10^5$ microns (the latter can include, e.g., what is commonly known as grapefruit-sized or melon-sized hail).

The skilled artisan will appreciate that when vehicle position and attitude parameters are obtained from "said sensor suite" on the vehicle, it is not necessarily from the same sensors in the sensor suite that gather the weather and cloud system data—that is to say, different sensors in the suite provide different data measurements. The skilled artisan will also appreciate that determining "which of said candidate clouds should be seeded" will generally involve ultimately identifying one or more. Yet further, the skilled artisan will appreciate that the "rate at which to disperse said appropriate seeding material" can include, e.g., volumetric or mass flow rate; "where and when to disperse said appropriate seeding material" implies for how long, i.e., when to start and when to stop.

In one or more embodiments, controlling the unmanned aerial vehicle to carry out the seeding on the candidate clouds to be seeded, in accordance with the determining step, is carried out in a secure and/or autonomous manner—for example, via adaptive control, a human flying a UAV, or manned flight. It is of course appropriate to comply with all local laws, rules, and regulations; to encrypt signals to prevent hacking and/or undesired dispensing; and to keep vehicles in a secure location, locked, and/or otherwise secured. Indeed, appropriate security procedures and practices should always be employed depending on the utilization context. UAVs should be physically secured to prevent access by nefarious persons and/or loading with other than appropriate seeding materials. Control signals should be sent in a secure manner.

Operation of one or more embodiments should be in accordance with appropriate rules for the jurisdiction of operation; e.g., FAA rules in the USA. For example, depending on local rules, it may be appropriate to provide the option for a human to override the autonomy/adaptive control. Due consideration should also be given to where to place the UAS/UGV. For example, that place may be off the main road, and/or not owned by the organization sponsoring or implementing the program. In the case of the latter we would get the appropriate permissions.

In some instances, sensor data can be used to help determine when to start and when to stop dispensing the seeding material. For example, the outputs from the sensor(s) 275, 255 sensing at least one of atmospheric aerosol size distribution and atmospheric cloud hydrometeor size distribution are sent to quality assurance and control within sensor algorithms 263, 243 following the standard steps under QC step 311, then to ground stations 109-2, 109-1 to compare against outputs from the Machine learning process as defined herein of established threshold conditions for seeding stored in SIL databases 281-2, 281-1. The results of that comparison are returned via telemetry 289, 291 and passed to seeding model 261, 241 that sends a signal via the CPU 277, 257 to the seeding system, seeding dispenser 265, 245 to begin seeding/stop seeding with the seeding material. When the at least one of atmospheric aerosol size distribution and atmospheric cloud hydrometeor size distribution changes to a certain point (i.e., the threshold condition), stop seeding. The skilled artisan, given the teachings herein, can set appropriate thresholds.

Many different items can be determined via machine learning in one or more embodiments; e.g., what clouds to seed; what seeding material to use; where and when to seed the clouds to be seeded; the path to take to arrive at the location given the in situ meteorological and aviation data; the mass and/or volume of seeding material to be dispersed per kilometer or other linear unit of flight; and the like. In some instances, the choice of seeding material can be predetermined; e.g. silver iodide or dry ice. In some cases hygroscopic flares may be appropriate or just silver iodide flares. One or more of temperature, updraft, droplet and other hydrometeor attributes can be used to make the determination in one or more embodiments; for example, via on-board information (e.g., sensor data 275,255; cloud imaging data 273,253; stored data 267, 247, 281, 293 non-radar data attributes (e.g., if no sensor data available)) and radar data from ancillary dataset 293.

Many different items can be included in the ancillary data 293, supplementing what is on the system, to guide operation or later on to prove that it was successful. Non-limiting examples include cloud imagery such as video other than 273, 253; model outputs for decision support; weather forecasts; numerical weather prediction model outputs; topography; satellite imagery; other 'Intelligent' Systems data; climatological; electrical; meteorological; microphysical and microchemical observations/measurements/assimilated data; and the like. For example, initially, radar data might indicate "go to location X." That location X is provided to the UAV's Autopilot 269 via telemetry 289 from the ground control station 109-2 radio 283-2 which received the information from the computer 285-2 after it processed the information from the mission planner 287-2 and SIL database 281-2. It is desired to go to X because there is a cloud there with certain appropriate environmental conditions. There can also be a video or other cloud imagery 273 feed to help to determine where the cloud is once the vehicle gets to that position. The operator at the control center 299 can see the feed. The operator may see the cloud and conclude all is in order; no intervention is necessary. There may also be weather report information 293 and/or other decision support outputs 293; e.g., icing at −10 C level 153; winds 10 mph at −5 C level 151 where the vehicle is flying; and so on. This information is present in the database 281-2 after quality assured by a routine on the CPU 285-2, and will be combined with the in situ data from onboard sensors 267 once the vehicle arrives proximate the candidate cloud and makes in situ measurements in and around that cloud 143. Once the vehicle arrives at the cloud to be seeded 143, and is proximate the cloud 143, the database can be updated to account for additional sensor data obtained proximate the cloud. Further, in case of a sensor failure (e.g. temperature sensor), temperature (or other missing data) can be obtained from another source (e.g., ancillary data set 293, Data 5 "Weather station"). Similarly, in case the particle sensor fails, the mission planner 287-2 instructs the CPU 285-2 to search ancillary data set 293 for a predetermined data archive to obtain relevant but degraded quality data to ensure best possible data available to make the determination to seed/no seed. Stored past records 267, 247 can also be consulted in some instances including cases of sensor failure for example, as a means to act as a 'fail safe' mechanism as previously mentioned. This information can be processed on the ground (e.g. in computer 285-2 and/or operations center 299, making use of SIL database 281-2, for example) and then sent via telemetry 289 to the UAV. So, data can be used to verify location, as part of a graceful degradation scheme, as a backup, and so on. The topography can similarly be treated together with navigation/aeronautical parameters, such as pitch, yaw, roll, and the like. The aircraft should be kept safely within the flight envelope.

Furthermore in this regard, in one or more embodiments, primary storage is in SIL databases 281-1, 281-2 with storage in 247, 267 primarily as a failsafe for the system, just in case connection is lost with GCS, and or with Mission Ops. In one or more embodiments, data storage on the vehicle is minimal except for data acquisition and some real time processing for algorithms. In some cases, where data is deemed unsuitable the vehicle returns to base. Also, in some cases, CPU 285-2 searches data set 293 for a predetermined data archive to obtain relevant but degraded quality data to ensure best possible data available to make the determination to seed/no seed.

Weather forecast output can include icing levels. This can lead to activation of the UAV's anti-icing system via a control signal from 269 after the icing data are sent via telemetry 289 and processing (e.g. at ground control station 109) of the sources of ancillary data 293.

As noted, some embodiments employ a training corpus, including data annotated by human expert to tell what clouds to seed and when based on at least one of atmospheric aerosol size distribution and atmospheric cloud hydrometeor size distribution, and other relevant parameters. The system is then trained on the annotated corpus. Some aspects can be based on deterministic calculations, such as comparisons to a stored threshold, in addition to machine learning. Machine learning systems typically become more robust with time as more data becomes available. One or more embodiments then use in situ data to see whether seeding criteria are met; if met, seed, else not. Where training and test corpora are employed, they can be stored, for example, in memories associated with computers 285-1, 285-2, a computer in the operations center 299, or even, in some instances, data stores 247, 267 or other memory available to CPUs 257, 277.

Consider use of radar data. Conventional systems use a software tool to analyze radar data from existing storms. For example, suppose the radar is turned on, makes a sweep, and five clouds are located; radar data from five clouds is now available. The software tool compares this data to its database and determines which cloud to seed. This conventional approach uses radar data. In a non-limiting example, this radar data is weather radar data which can be gathered at distances ranging from 1 to 250 miles away or, in some instances, 50-250 miles away. In one or more embodiments, this is taken as a starting point, but data on the platform is used from inside the cloud for comparison with the threshold. Some radar systems look at large (rain) droplets (on the order of 5-6 mm) with a 10 cm band weather radar. Some embodiments use 5 cm band radar to detect drizzle drops (on the order of 1 mm), to get an earlier indication of precipitation.

In one or more embodiments, the RADAR is used to provide data of possible candidate clouds. Weather Radar Software 813 (e.g., TiTAN software mentioned elsewhere herein) then takes these clouds and compares these data against previous training data which is previous radar data to help chose the clouds that will most likely respond positively to seeding as added by the skilled operator. Thus, aspects of the invention enhance previous techniques using TiTAN software with in situ data based on more robust data parameters. In this regard, Radar data are crude and are not always of the right part of a cloud for ideal seeding. Note the functional relationship between the precipitation hydrometeors and the radar measurement, which is reflectivity (Radar reflectivity is proportional to hydrometer size to the 6th power). So, guessing at the size has the inherent error magnitude of at least 6 times the error in the size value estimated, versus using the on board sensor size distribution data at the more proximate cloud location, as in one or more embodiments, thus employing more robust data parameter(s), for example.

In some instances, an additional aspect involves deciding what seeding material to use. Some embodiments use new materials such as nanoparticles, which are still at the research and development stage. Conventional materials can also be employed.

Further aspects of exemplary ground-based systems 113 will now be discussed. In some instances, each ground-based (stationary, tethered, and mobile) unmanned ground vehicle is autonomously controlled remotely and provided with machine learning capability. Refer to UGV 113 with CPU 257 communicating via telemetry 291 with ground control station 109-1 having SIL database 281-1, mission planner 287-1, computer 285-1, access to ancillary data 293, and capability for communication back to CPU 257 on UGV 113 via telemetry 291. The ground-based system has an autonomy or remote control (component 249) that is initially controlled remotely by mesoscale and regional NWP model guidance from dataset 293; its on-board (concurrent) sensor payload 255, 253; and/or other UGV 113, UAS 105, and/or other ancillary data 293. Human over-ride capability from operations center 299 can be provided in one or more embodiments.

In some instances, guidance is provided via mission planner 287-1 and based on data set 293 and in situ (on board) UGV data 255 from sensor algorithms 243, processed via computer 285-1 and/or CPU 257 and used in near-real-time to: (1) optimally control the start and stop seeding actions (seeding model 241 and dispenser 245); (2) determine whether a UGV should become mobile (e.g. under remote control 249) and/or whether a UAS 105 should be used; (3) control the type of material dispensed 245, and/or (4) keep track of the total amount dispensed from unit 245. In some cases, the entire sequence just set forth immediately above is continuously updated, and the system is capable of machine learning. In some embodiments, the ground system's concurrent in situ (on board) sensor payload or model-simulated data identify when systems are seedable. In some instances, this aspect is similar to UAS embodiments, except that the UGV might not be moving).

In some instances, when cloud systems are seedable, the autonomy module 249 turns on all, one or none of the systems as a function of the environmental conditions as measured by sensors 255 with algorithms 243, and continues the seeding operation until the conditions have ended as determined by the in situ sensor suite 255 (e.g. on the UGV). In one or more embodiments, UGV controlling algorithms 249, 287-1 also determine whether a UGV 113 should become mobile, provide alerts via telemetry 291 for reloading the seeding materials, and communicate, via radio 251, extreme weather conditions. Once seeding ends, each system can continue to make measurements as required. Further, non-seeding 'Intelligent' Systems in an array of UGVs can be employed to collect data throughout the same period, concurrently with the systems that were seeding.

In some cases, if it is determined that a given UGV 113 should be mobile, then remote control 249 will move it to the location determined to yield a suitable and preferably optimal location to seed the cloud, if the cloud is within the range of that UGV. If that UGV is not in range and the UGV is part of an array, then the mission planner 287-1 determines which UGV/UGVs should start seeding at current locations and/or be moved to start seeding. Some embodiments direct a UAS 105 to the location if the cloud 143 is not in the range of the UGV 113 and that UGV 113 is not able to move.

In some cases, data is processed to control the start and stop seeding actions as herein defined as well as to control the type of material dispensed as herein defined, and to keep track of the total amount dispensed as herein defined. Alerts can also be provided for reloading the seeding materials, and even for communicating extreme weather conditions. It is worth noting that conventional practice is to have a local or remote operator physically turn on or dial up the ground seeding generators based on commercially available information that may or may not be timely, or locally relevant.

In some embodiments relating to ground-based systems, obtain data including when candidate clouds can be seeded. Based on data including the current location of the unmanned ground vehicle 113, and in situ data 255 to determine seeding signature, cause a control signal to be sent to start seeding as herein defined or to move to a ground location proximate to the candidate cloud 143 to be seeded as herein defined; then, based on in situ data, start seeding as herein defined. Some embodiments obtaining, from a sensor suite on the unmanned ground vehicle 255, while stationary and/or moving proximate at least to the candidate cloud to be seeded 143, weather and cloud system data including atmospheric temperature; atmospheric pressure; data indicating humidity; wind components; and at least one of atmospheric aerosol size distribution and atmospheric cloud hydrometeor size distribution.

Some embodiments further include obtaining vehicle position and (where relevant) attitude parameters from the sensor suite on the unmanned ground vehicle. Based on the weather and cloud system data and the vehicle position and (where relevant) attitude parameters, some embodiments determine, via a machine learning process, when within the candidate clouds, when to disperse the appropriate seeding material; and when to stop seeding; and control the unmanned ground vehicle to carry out the seeding on the candidate clouds to be seeded, in accordance with the determining step.

The wind components can include, for example, magnitude and direction of three vector components.

In some instances, determining via machine learning further includes a rate at which to disperse the appropriate seeding material.

Some embodiments further include obtaining ancillary data from a location other than the sensor suite on the unmanned ground vehicle; the determining, via the machine learning process, is then further based on the ancillary data. The ancillary data can be obtained, for example, from at least one of a manned ground vehicle, a radar installation, another unmanned ground vehicle, and an unmanned aircraft system.

It is worth noting that ground-based systems are typically more terrain-sensitive than aerial systems. Use of video or other cloud imagery is desirable in one or more embodiments. Topography will influence seeding in one or more ground-based instantiations. Conventionally, lit flares are deployed on a stationary tall pole, or a block of dry ice is located in the back of a truck and a driver drives up and down a pre-determined path. In another aspect, in mountainous terrain, there may be a plurality of stationary ground generators 121, 123, 125 that dispense the seeding material into the air, and thence into the cloud, under conditions when it will go to the right location to cause the precipitation fall where it needs to fall (i.e., target area 115), depending on the atmospheric and weather conditions. In some instances, the human operator may not be on-site. For example, the human operator may be in Reno, Nevada but may be seeding on the California side of Lake Tahoe. Thus, the conditions should be forecast remotely (e.g. via operations center 299) in one or more embodiments. Then, a signal is sent, or a telephone call is placed to a farmer (non-limiting example of a landowner where the system is located) or the like to cause the generator to be turned on.

Further regarding dependence on terrain/topography, terrain/topography changes may relate, e.g., to differences in air temperature and/or wind field. Depending on the temperature and wind field profiles, especially near the surface, at least aspects may be pertinent: (i) is the air temperature cold enough to seed; and (ii) does the wind field indicate, based on the vertical component of the wind, whether seeding material will travel to a level where it can not only nucleate ice but, given that wind profile, travel to the target area? Based on the teachings herein, a skilled person in the field will be able to deal with terrain/topography issues.

Given the discussion thus far, it will be appreciated that, in general terms, another exemplary method, according to another aspect of the invention, includes obtaining, from a ground-based sensor suite (e.g. 255) including a plurality of sensors, associated with a ground-based seeding suite including a plurality of seeding apparatus (e.g. multiple systems 113 with dispensers 245), weather and cloud system data. The data can be obtained, for example, at station 109-1 via telemetry 291. A further step includes, based on the weather and cloud system data, determining, via a machine learning process, which individual ones of the ground-based seeding apparatus to activate, and when. The machine learning process can be carried out, for example, in ground control station 109-1 using computer 285-1, mission planner 287-1, and SIL database 281-1. Still a further step includes sending control signals (e.g. telemetry 291) to the individual ones of the ground-based seeding apparatus (e.g. one or more systems 113), to cause same to emit seeding material (e.g. from dispensers 245), in accordance with the determining step. In some instances, fixed seeding apparatus 121, 123, 125 could be employed. Appropriate components similar to those in UGV 113 could be employed analogously for the fixed seeding apparatus.

In some instances, none of the ground systems 113 may be appropriately positioned for seeding. Thus, in some cases, additional steps include repeating the obtaining step to obtain different weather and cloud system data; based on the different weather and cloud system data, determining, via the machine learning process, that no individual ones of the ground-based seeding apparatus are appropriate to be activated in their current locations; and sending further control signals (e.g. via telemetry 291) to at least one of the individual ones of the ground-based seeding apparatus 113, to cause same to reposition itself to an appropriate location for seeding.

In some instances, none of the ground systems 113 may be appropriately positioned for seeding, and they may not be mobile or repositioning may not be practicable. Thus, in some cases, additional steps include repeating the obtaining step to obtain different weather and cloud system data; based on the different weather and cloud system data, determining, via the machine learning process, that no individual ones of the ground-based seeding apparatus are appropriate to be activated in their current locations; and, responsive to the determining, sending further control signals to cause at least one aerial vehicle (e.g. 105) (in general, manned and/or unmanned) to position itself to an appropriate location for seeding. For example, station 109-1 advises station 109-2 via Ethernet 297, or radios 251 and/or 271 communicate, or communicate via 129 or a direct communication path between 105-1 and 113a (omitted to avoid clutter).

In some cases, in the obtaining step, the plurality of sensors 255 are collocated with the plurality of seeding apparatus 245 on a plurality of ground vehicles 113. In other embodiments, separate sensor suites, not on the vehicles, could be used.

In some instances, the step of determining via machine learning further takes into account at least one of remote sensing data (e.g. part of dataset 293) and weather model output data (e.g. part of dataset 293). In this regard, non-limiting examples of remote sensing data include radar data, LIDAR data, and satellite data (e.g. part of dataset 293). Weather model output data (e.g. part of dataset 293) can also be used (weather model predicts where clouds will go). Both ground-based 113a, 113b and aerial 105a, 105b embodiments can, as appropriate, use both remote sensing data and weather model data.

Furthermore in this regard, one or more embodiments use weather and radar information (e.g. part of dataset 293) plus information on the vehicle (e.g. from sensors 255, 275) to determine whether to start seeding. For movable vehicles, it is possible to have sensors at locations without vehicles (e.g. "other data" in dataset 293) and determine that a vehicle such as a seeding truck 113 should be moved there. For example, feed data (e.g. "other data" in dataset 293) into the machine learning component via telemetry 291 to determine the best location for ground seeding vehicles (e.g. trucks). For example, the data from the dataset 293 is routed via switch 295, Ethernet 297 (or any other suitable wired or wireless network), mission planner 287-1, and SIL database 281-1 with processing on computer 285-1. Suppose, purely by way of example and not limitation, that there are three seeding vehicles 113 all within a certain distance of each other, and perpendicular to the wind field. In one or more embodiments, the machine learning component has a subroutine that, given the conditions from the weather forecast (e.g. part of dataset 293) and the radar (e.g. part of dataset 293) and the wind field (e.g. part of dataset 293 plus from sensor payload 255), determines that if the three vehicles are activated (the vehicle locations are known; the local information from their sensors is available), the seeding material will not reach the target area 115. Therefore, it is further determined (for example) to move the first vehicle north two miles (3.2 km), keep the second vehicle at the same location; and move the third vehicle number south two miles (3.2 km). Once the vehicles re-deploy to the new locations based on the machine learning (say, on the order of one minute), the control system 249 instructs them to begin seeding 245. The vehicles re-deploy, for example, via signals from their remote controls 249 based on camera data 253, sensor data 255, and data from dataset 293; and based on machine learning undertaken by mission planner 287-1 using data 281-1 with processing on computer 285-1.

In one or more embodiments, the sensor payload 255 on ground vehicles 113 will be similar to the sensor payload 275 on the airborne platforms 105. Each ground or aerial vehicle has a seeding system 245, 265 attached, in one or more embodiments. Whether or not to seed depends, in one or more embodiments, on data and the results of the machine learning process. One or more embodiments, for example, use radar information and weather information, are mindful of topography (typically more important for ground-based than airborne systems), and also have a known seeding material available. Using that information, and the video or other cloud imaging to verify presence within a cloud, a determination is made whether to start seeding or not. In one or more embodiments, ground vehicles can optionally be moved.

It will be further appreciated that one or more embodiments are directed to a system including a memory, and at least one processor, coupled to the memory, and operative to carry out or otherwise facilitate any one, some, or all of the method steps described herein.

The at least one processor could be, for example, a processor of ground station computer 285, a processor of an operations center 299, or CPUs 257 and/or 277 or one or more of same suitably coupled (e.g., a ground control station processor of computer 285 coupled (e.g., via telemetry or other wireless or even wired techniques in appropriate cases) to a remote vehicle processor 257, 277).

The system can include the additional components depicted in FIGS. 1, 2, and/or 8, for example.

Figure 4:
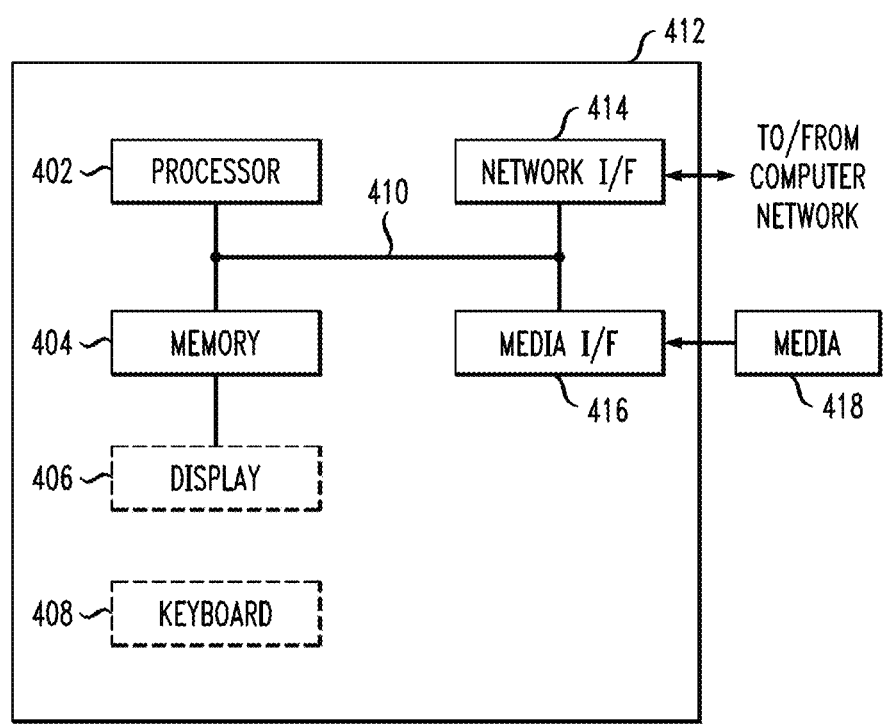
FIG. 4 depicts a computer system that may be useful in implementing one or more aspects and/or elements of the invention.

One or more embodiments can make use of software running on a processor (e.g., CPUs 257, 277 or processors of computers 285-1, 285-2 or a computer in operations center 299). With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418 (a USB port interfacing with a so-called "thumb" drive is another example).

The network interface can also be envisioned as representing a wireless and/or wired data link. Not every instance will have a keyboard and display. For example, a computing unit on a UAV may have a processor, memory, and wireless transceiver, while that in a ground control unit may have a keyboard and display as well as a processor, memory, and wireless transceiver. Where analog sensors are used, suitable analog-to-digital (A/D) converters can be employed.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As used herein, including the claims, a "server" includes a physical data processing system (for example, system 412 as shown in FIG. 4) running a server program. It will be understood that such a physical server may or may not include a display and keyboard.

These computer program instructions may also be stored in a computer readable medium that can configure a processor to function in a particular manner, such that the instructions stored in the computer readable medium cause the processor to carry out learning, adaptation, and control functionality.

Thus, FIG. 4 is representative of aspects of a processor and memory that may be on a UAV and/or at a ground station or operations center, and the memory can include memory associated with a processor as well as a computer-readable medium or other non-volatile memory from which instructions can be loaded.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, one exemplary module is a machine learning module as described herein. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations of hardware and software. Application specific integrated circuit(s) (ASICS), field-programmable gate arrays (FPGAs), functional circuitry, one or more appropriately programmed general purpose digital computers with associated memory, and the like, are all examples.

Given the teachings of the invention provided herein, one of ordinary skill in the related art will be able to contemplate other implementations.

The following list of acronyms and abbreviations is provided for the convenience of the reader:

AgI—Silver Iodide
AI—Artificial intelligence
AiMS—Atmospheric icing conditions measurement system
ANSI—American National Standards Institute
ASCE—American Society Civil Engineers
ASICS—Application specific integrated circuit(s)
BCPD—Back-scatter cloud probe with polarization detection
CAS—Cloud and Aerosol Spectrometer
CDP—Cloud droplet probe
CMMI—Capability Maturity Model Integration
CPI—Cloud particle imager
CPU—Central processing unit
CWIP—Cloud water inertial probe
C4ISR—Communications, Computers, Intelligence, Surveillance, and Reconnaissance
DI—Dry ice
DMT—Droplet Measurement Technologies Inc.
DSD—Droplet size distribution
EWRI—Environmental Water Resources Institute
FAA—Federal Aviation Administration
FPGA—Field programmable gate arrays
GCS—Ground control station
GPS—Global positioning system
LIDAR—Light Detection and Ranging
MI—Machine intelligence NI—Natural intelligence
NWP—Numerical weather prediction
PMO—Program management office or organization
POPS—Printed optical particle spectrometer
QA—Quality assurance
QF1—Quality Flag per first pass.
RADAR—Radio Detection and Ranging
RAM—Random access memory
ROM—Red only memory
SIL—Software-in-the-loop
SLW—Supercooled liquid water
UAV—Unmanned airborne vehicle; sometimes called unmanned aerial vehicle.
UAS—Unmanned aircraft system
UGV—Unmanned Ground Vehicle
US—United States (of America)
USB—Universal serial bus
WMA—Weather Modification Association
ZDR—Differential reflectivity
3D—Three dimensional

What is claimed is:

1. A method comprising steps of:
obtaining data comprising current locations of candidate clouds to be seeded;
based on said data comprising said current locations of said candidate clouds to be seeded, causing a first vehicle to move proximate at least one of said candidate clouds to be seeded;
obtaining, from a sensor suite associated with said first vehicle, while said first vehicle and said sensor suite are proximate said at least one of said candidate clouds to be seeded, weather and cloud system data, said weather and cloud system data comprising at least one of atmospheric temperature, atmospheric wind components, atmospheric aerosol size distribution and atmospheric cloud hydrometeor size distribution;
obtaining vehicle position parameters from said sensor suite associated with said first vehicle;
based on said weather and cloud system data and said vehicle position parameters, determining:
an appropriate seeding material to be used;
which of said candidate clouds should be seeded; and
within those of said candidate clouds which should be seeded, where to disperse said appropriate seeding material; and
a rate at which to disperse said appropriate seeding material, wherein determining said rate comprises estimating a rate of seeding required to modify measured atmospheric cloud hydrometeor size distribution for a seeding effect; and
wherein said appropriate seeding material to be used and the rate at which to disperse said appropriate seeding material are based at least in part on at least a portion of the sensor and cloud system data; and
controlling a second vehicle to carry out said seeding on said candidate clouds to be seeded, in accordance with said determining step.

2. The method of claim 1, wherein, in said step of obtaining said weather and cloud system data, said weather and cloud system data comprises said atmospheric temperature, and further comprises data indicating humidity.

3. The method of claim 2, wherein, in said step of obtaining said weather and cloud system data, said weather and cloud system data comprises said atmospheric wind components, and further comprises atmospheric pressure and cloud imagery.

4. The method of claim 3, wherein, in said step of obtaining said weather and cloud system data, said atmospheric wind components comprise magnitude and direction of three vector components.

5. The method of claim 1, wherein:
said first vehicle comprises an aerial vehicle;
said sensor suite is on said aerial vehicle;
said step of causing said first vehicle to move proximate said at least one of said candidate clouds to be seeded comprises causing said aerial vehicle to fly proximate said at least one of said candidate clouds to be seeded; and
said step of obtaining said weather and cloud system data comprises obtaining said weather and cloud system data from said sensor suite while said aerial vehicle is flying proximate said at least one of said candidate clouds to be seeded.

6. The method of claim 5, wherein:
said aerial vehicle comprises a first, unmanned aerial vehicle;
said second vehicle comprises a second, unmanned aerial vehicle;
said step of causing said first, unmanned aerial vehicle to fly proximate said at least one of said candidate clouds to be seeded comprises causing a first control signal to be sent to said first, unmanned aerial vehicle to cause said first, unmanned aerial vehicle to fly proximate said at least one of said candidate clouds to be seeded; and
said step of controlling said second, unmanned aerial vehicle to carry out said seeding on said candidate clouds to be seeded, in accordance with said determining step, comprises causing a second control signal to be sent to said second, unmanned aerial vehicle to cause said second, unmanned aerial vehicle to carry out said seeding on said candidate clouds to be seeded, in accordance with said determining step.

7. The method of claim 6, further comprising, subsequent to said obtaining of said weather and cloud system data from said sensor suite associated with said first vehicle, repositioning said first vehicle and carrying out sampling with said first vehicle.

8. The method of claim 7, wherein said repositioning comprises downwind repositioning.

9. The method of claim 8, further comprising, prior to carrying out said steps, testing an initial candidate cloud to be seeded and determining that said initial candidate cloud to be seeded is not suitable for seeding, wherein causing said first unmanned aerial vehicle to move proximate said at least one of said candidate clouds to be seeded is responsive to said determining that said initial candidate cloud to be seeded is not suitable for seeding.

10. The method of claim 9, wherein said determining further comprises a mission planner interrogating a software-in-the-loop database, said mission planner further determining a flight path for each of said first and second unmanned vehicles, further comprising repeating said steps for a plurality of missions and updating said software-in-the-loop database after each of said missions.

11. The method of claim 7, further comprising carrying out real-time video processing on cloud imagery feed from at least one of said first and second unmanned aerial vehicles.

12. The method of claim 7, further comprising:
detecting an icing condition on said at least one of said first and second vehicles; and
responsive to said detecting, initiating a de-icing procedure.

13. The method of claim 5, wherein:
said second vehicle comprises a manned aerial vehicle; and
said controlling of said manned aerial vehicle to carry out said seeding on said candidate clouds to be seeded comprises communicating results of said determining step to a human operator of said manned aerial vehicle.

14. The method of claim 1, wherein:
said first vehicle comprises a ground vehicle;
said step of causing said first vehicle to move proximate said at least one of said candidate clouds to be seeded comprises causing said ground vehicle to drive proximate said at least one of said candidate clouds to be seeded.

15. The method of claim 14, wherein:
said sensor suite is on said ground vehicle; and
said step of obtaining said weather and cloud system data comprises obtaining said weather and cloud system data from said sensor suite while said ground vehicle is driving or stationary and is proximate said at least one of said candidate clouds to be seeded.

16. The method of claim 15, wherein:
said ground vehicle comprises a first, unmanned ground vehicle;
said second vehicle comprises a second, unmanned ground vehicle;
said step of causing said first, unmanned ground vehicle to drive proximate said at least one of said candidate clouds to be seeded comprises causing a first control signal to be sent to said first, unmanned ground vehicle to cause said first, unmanned ground vehicle to drive proximate said at least one of said candidate clouds to be seeded; and
said step of controlling said second, unmanned ground vehicle to carry out said seeding on said candidate clouds to be seeded, in accordance with said determining step, comprises causing a second control signal to be sent to said second, unmanned ground vehicle to cause said second, unmanned ground vehicle to carry out said seeding on said candidate clouds to be seeded, in accordance with said determining step.

17. The method of claim 16, further comprising, subsequent to said obtaining of said weather and cloud system data from said sensor suite associated with said first vehicle, repositioning said first vehicle and carrying out sampling with said first vehicle.

18. The method of claim 17, wherein said repositioning comprises downwind repositioning.

19. The method of claim 18, further comprising, prior to carrying out said steps, testing an initial candidate cloud to be seeded and determining that said initial candidate cloud to be seeded is not suitable for seeding, wherein causing said first unmanned ground vehicle to move proximate said at least one of said candidate clouds to be seeded is responsive to said determining that said initial candidate cloud to be seeded is not suitable for seeding.

20. The method of claim 19, wherein said determining comprises a mission planner interrogating a software-in-the-loop database, said mission planner further determining a path for each of said first and second unmanned ground vehicles, further comprising repeating said steps for a plurality of missions and updating said software-in-the-loop database after each of said missions.

21. The method of claim 14, wherein:
said second ground vehicle comprises a manned ground vehicle; and
said controlling of said second ground vehicle to carry out said seeding on said candidate clouds to be seeded comprises communicating results of said determining step to a human operator of said manned ground vehicle.

22. The method of claim 1, further comprising:
continuing to obtain at least said at least one of atmospheric aerosol size distribution and atmospheric cloud hydrometeor size distribution during said seeding, until a threshold value of said distribution is crossed, said threshold comprising a threshold for yielding precipitation determined using a decision tree classifier; and
causing said seeding to cease when said threshold is crossed.

23. The method of claim 1, wherein said step of determining further takes into account at least one of remote sensing data and weather model output data.

24. The method of claim 1, further comprising training a machine learning module on an annotated corpus, wherein said step of determining is carried out via a machine learning process using said trained machine learning module.

25. A system comprising:
a memory; and
at least one processor, coupled to said memory, and operative to:
obtain data comprising current locations of candidate clouds to be seeded;
based on said data comprising said current locations of said candidate clouds to be seeded, cause a first vehicle to move proximate at least one of said candidate clouds to be seeded;
obtain, from a sensor suite associated with said first vehicle, while said first vehicle and sensor suite are proximate said at least one of said candidate clouds to be seeded, weather and cloud system data, said weather and cloud system data comprising at least one of atmospheric temperature, atmospheric wind components, atmospheric aerosol size distribution and atmospheric cloud hydrometeor size distribution;
obtain vehicle position parameters from said sensor suite associated with said first vehicle;
based on said weather and cloud system data and said vehicle position parameters, determine:
an appropriate seeding material to be used;
a rate at which to disperse said appropriate seeding material, wherein determining said rate comprises estimating a rate of seeding required to modify measured cloud hydrometeor size distribution for a seeding effect; and
wherein said appropriate seeding material to be used and the rate at which to disperse said appropriate seeding material are based at least in part on at least a portion of the sensor and cloud system data; and
which of said candidate clouds should be seeded; and
within those of said candidate clouds which should be seeded, where to disperse said appropriate seeding material; and
control a second vehicle to carry out said seeding on said candidate clouds to be seeded, in accordance with said determining step.

26. The system of claim 25, wherein said at least one processor comprises at least a ground control station processor coupled to a remote vehicle processor.

* * * * *